June 12, 1962 F. A. FOSS 3,038,657
ELECTRICAL SWITCHING APPARATUS
Filed Jan. 2, 1957 18 Sheets-Sheet 1

INVENTOR.
FREDERIC A. FOSS
BY
Campbell, Baumbaugh, Free + Grave
his ATTORNEYS.

June 12, 1962  F. A. FOSS  3,038,657
ELECTRICAL SWITCHING APPARATUS
Filed Jan. 2, 1957  18 Sheets-Sheet 4

INVENTOR.
FREDERIC A. FOSS
BY
Campbell, Brumbaugh, Free & Graves
his ATTORNEYS.

June 12, 1962 F. A. FOSS 3,038,657
ELECTRICAL SWITCHING APPARATUS
Filed Jan. 2, 1957 18 Sheets-Sheet 5

INVENTOR.
FREDERIC A. FOSS
BY
Campbell, Brumbaugh, Free & Graves
his ATTORNEYS.

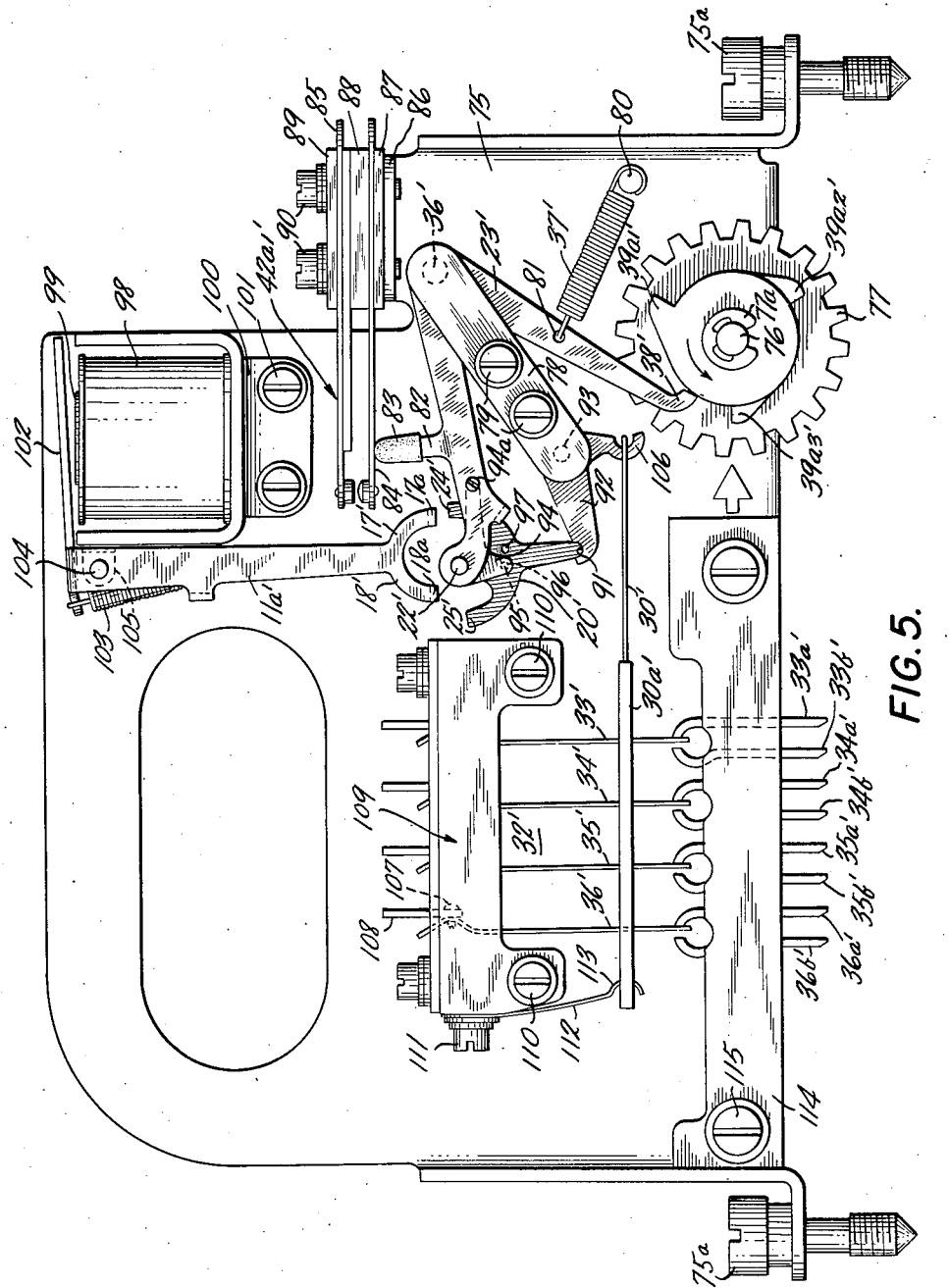

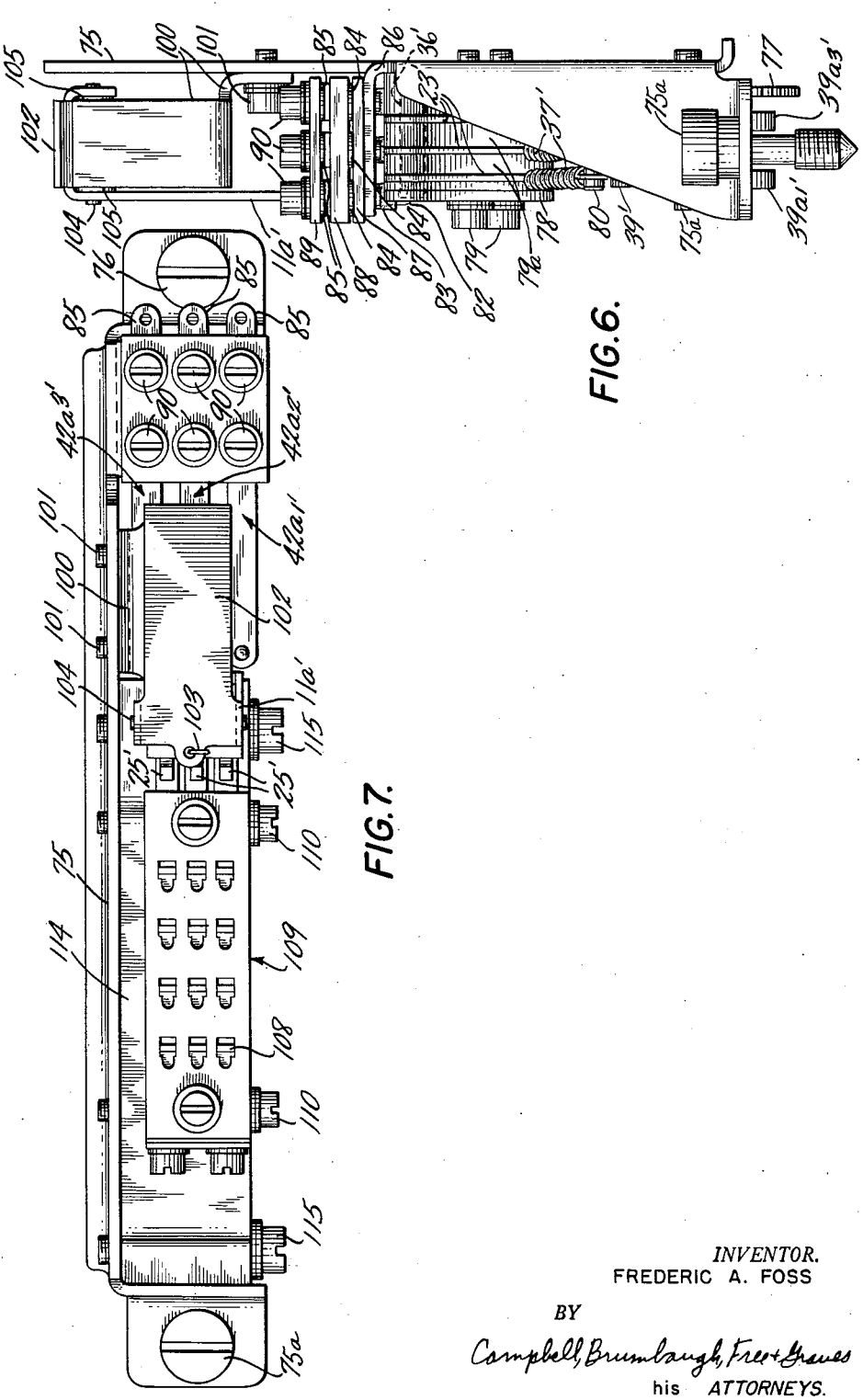

June 12, 1962   F. A. FOSS   3,038,657
ELECTRICAL SWITCHING APPARATUS
Filed Jan. 2, 1957   18 Sheets-Sheet 8

INVENTOR.
FREDERIC A. FOSS
BY
Campbell, Brumbaugh, Free & Graves
his ATTORNEYS

June 12, 1962  F. A. FOSS  3,038,657
ELECTRICAL SWITCHING APPARATUS
Filed Jan. 2, 1957  18 Sheets-Sheet 10

FIG.9B.

June 12, 1962 F. A. FOSS 3,038,657
ELECTRICAL SWITCHING APPARATUS
Filed Jan. 2, 1957 18 Sheets-Sheet 12

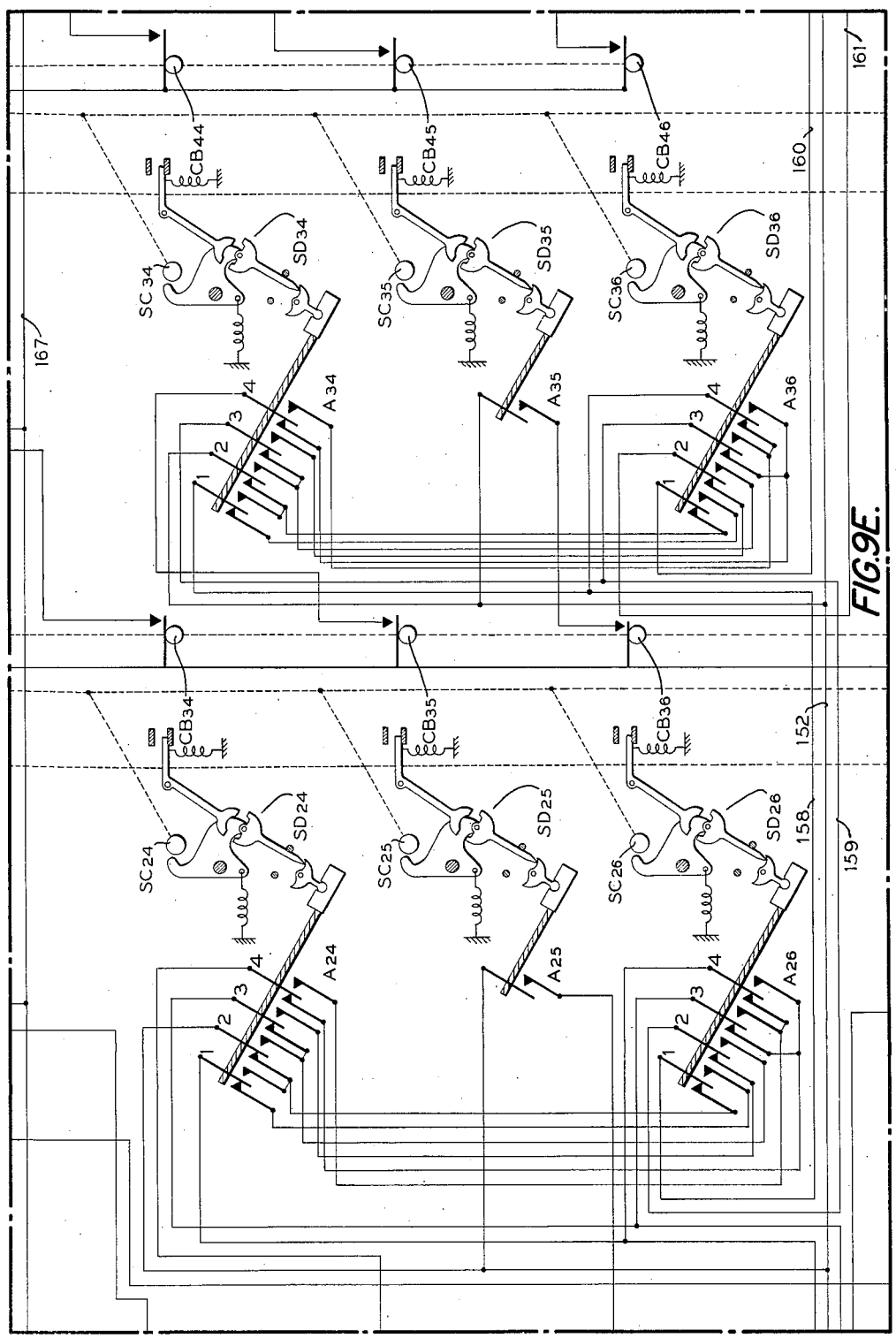

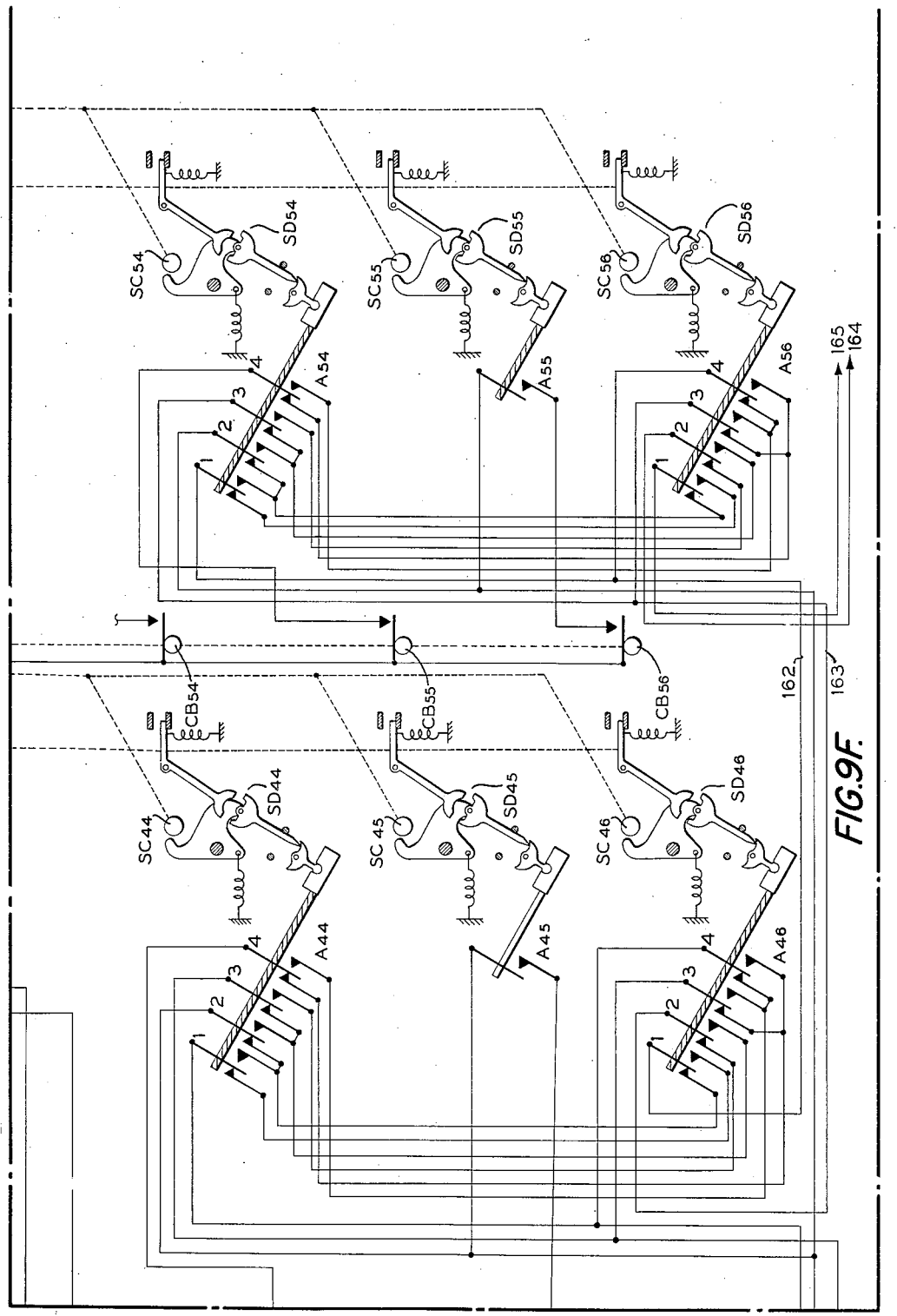

United States Patent Office 3,038,657
Patented June 12, 1962

3,038,657
ELECTRICAL SWITCHING APPARATUS
Frederic A. Foss, Binghamton, N.Y., assignor to International Business Machines Corporation, New York, N.Y., a corporation of New York
Filed Jan. 2, 1957, Ser. No. 632,215
26 Claims. (Cl. 235—61.6)

This invention relates to logical circuits, and more particularly, to such circuits in which various elements are sequentially switched.

Switching circuits may be grouped into two general classifications, combinational and sequential circuits. A combinational circuit may be identified by its operation, a combination of input signals establishing a definite combination of output conditions independent of the order in which the input signals are applied. On the other hand, a sequential circuit is characterized by an operation in which the output conditions are determined jointly by the sequence in which the input signals occur as well as by the combinations of input signals. In other words, a sequential circuit first recognizes certain input combinations by its arrangement of switches, retains a memory of those input combinations which have occurred, and uses this memory to establish later circuit actions.

There are many and varied circuit applications in which sequential switching is necessary. The serial reception and decoding of the five intelligence unit signal (Baudot teletype code) requires sequential electromechanical actions within standard teletype printers. In addition, the relay control circuits of electric accounting machines are sequentially pulsed by timed circuit breakers. Other special applications include logical circuits such as accumulators, adders and multipliers which require a definite sequencing of circuit actions.

Accordingly, it is an object of the present invention to provide apparatus for performing a plurality of logical functions.

It is another object of the invention to provide apparatus of the above character comprised of a number of similar elements.

It is a further object of the invention to provide apparatus having the above characteristics in which the similar elements are oriented in a matrix arrangement.

It is yet another object of the invention to provide a matrix arrangement of similar elements that are sequentially made operable by rows, a single element in a particular column being operated by selecting the column when the row in which the single element is contained is made operable.

It is still a further object of the invention to provide a matrix arrangement of similar elements for shifting a digital indication registered in the elements to different elements sequentially.

It is another object of the invention to provide a matrix arrangement of similar elements for accumulating a series of digital indications sequentially registered in the elements.

It is still another object of the invention to provide a matrix arrangement of similar elements for multiplying two digital indications together which are registered in the elements.

It is yet another object of the invention to provide combined relay coil and cam operated switching devices useful in the above matrix arrangements.

It is still a further object of the invention to provide a register formed of groups of the combined relay coil and cam operated switching devices of the above character for performing logical functions.

These and further objects of the invention are accomplished by disposing a plurality of bistable switching devices in a matrix arrangement. Contacts controlled by the switching devices are suitably interconnected with conditioning means that condition a first group of the devices for operation. Sequentially actuated operating means associated with a second group of devices, each of the groups containing devices common to other groups, operate them. Any devices in a conditioned group will, therefore, be operated to one of its stable states, the devices being bistable, when the operating means associated with the particular second group in which the devices is contained is made operable.

The bistable devices may be connected in rows and columns to form various logical circuits such as accumulators, adders, transfer registers and multipliers.

A preferred bistable switching device for use in the above-referred to logical circuits comprises a relay coil actuating armature means preferably including a plurality of armatures, the position of the armatures determining the operation of associated switches subsequent to actuation of selectors by cam operating means or similar mechanical members. Circuit breakers, operated in synshronism with the selector cams, are interconnected with the switches to control the relay coils. With the relay coil deenergized, actuation of a particular selector by a cam results in operating the associated switches to a first position while with the relay coil energized, actuation of the same selector results in operating the switches to a second position.

These and further objects and advantages of the invention will be more readily understood when the following description is read in connection with the accompanying drawings in which.

Figure 3A:
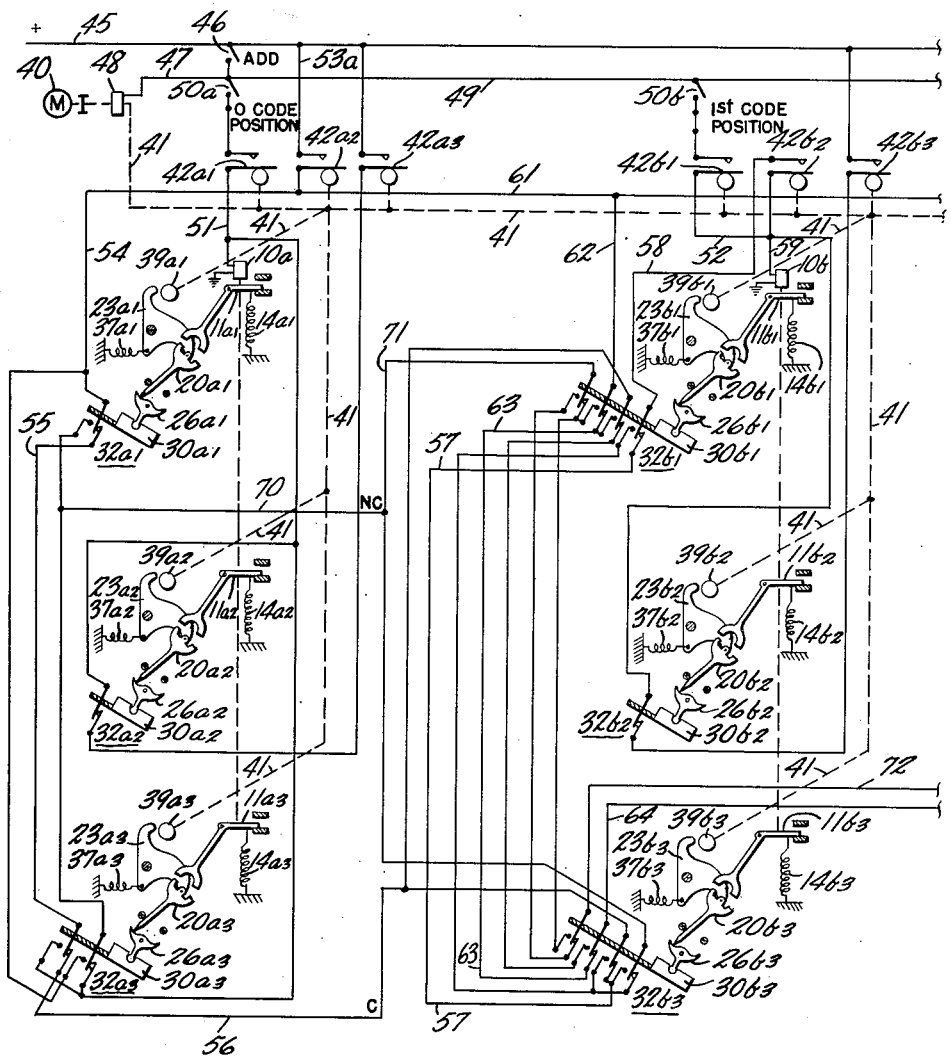
Figure 3B:
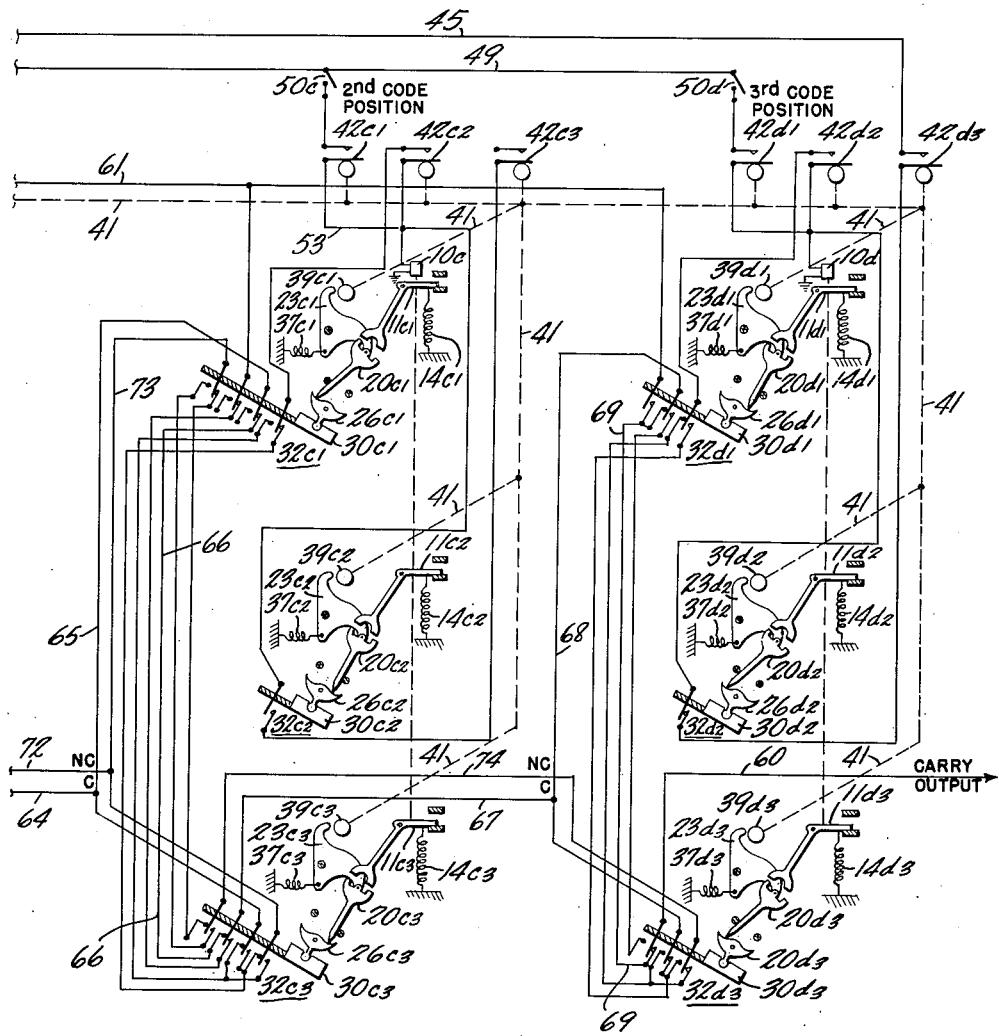
Figure 4:
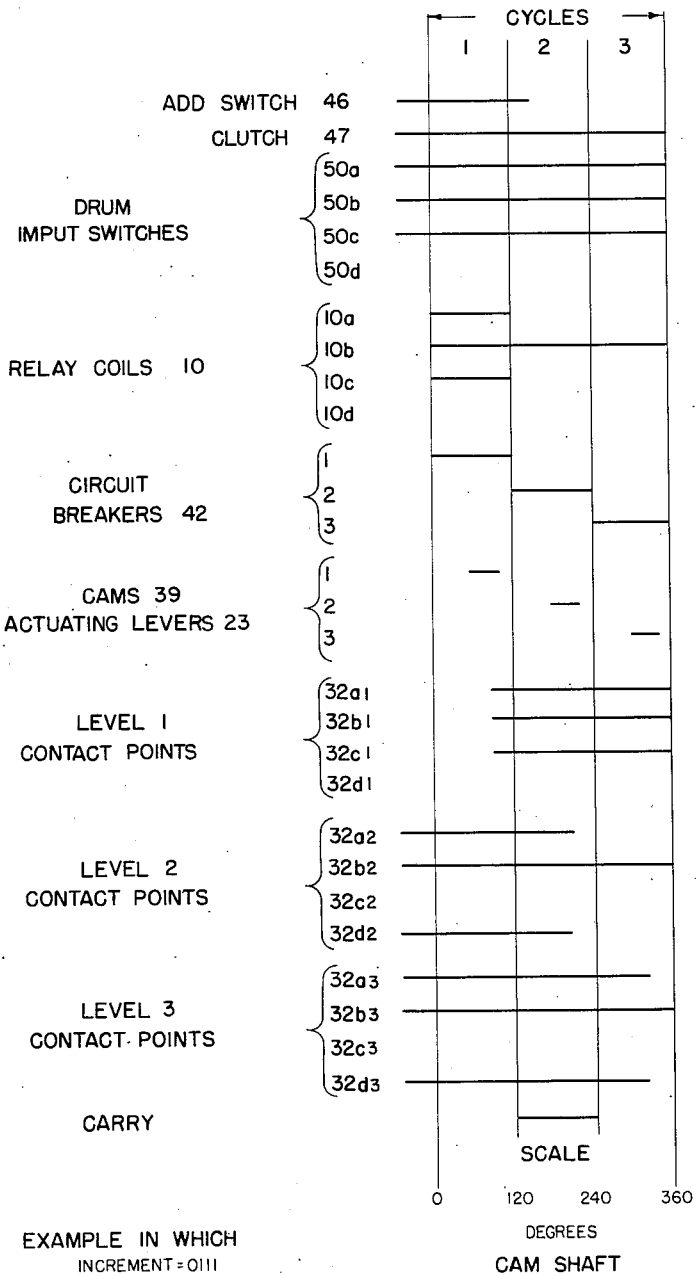
Figure 8:
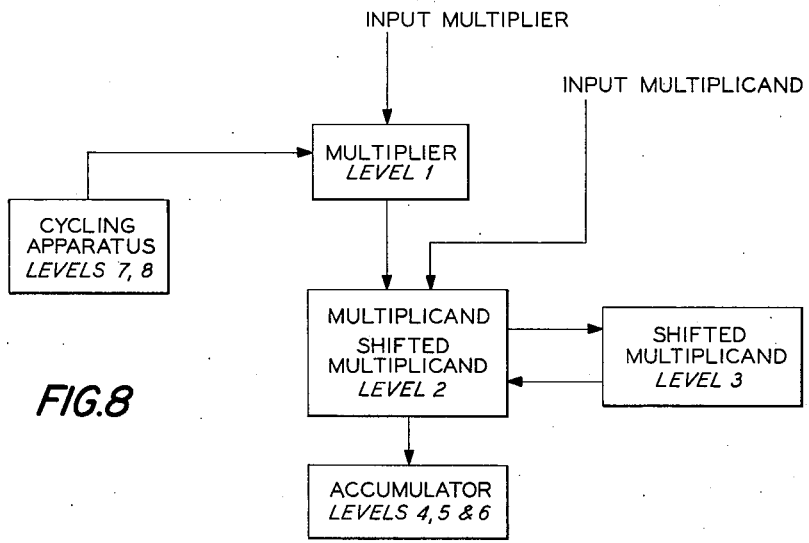
Figure 10:
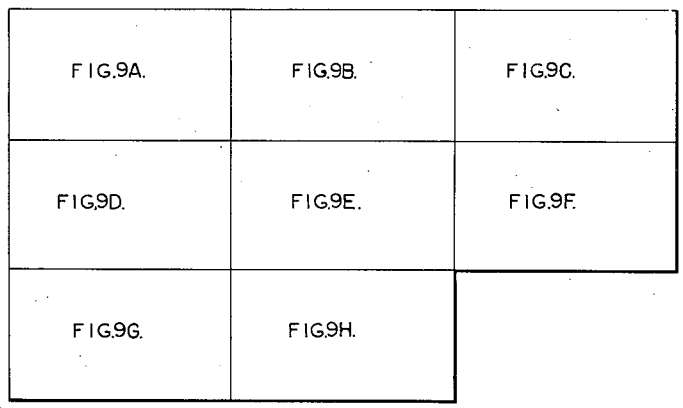
Figure 11:
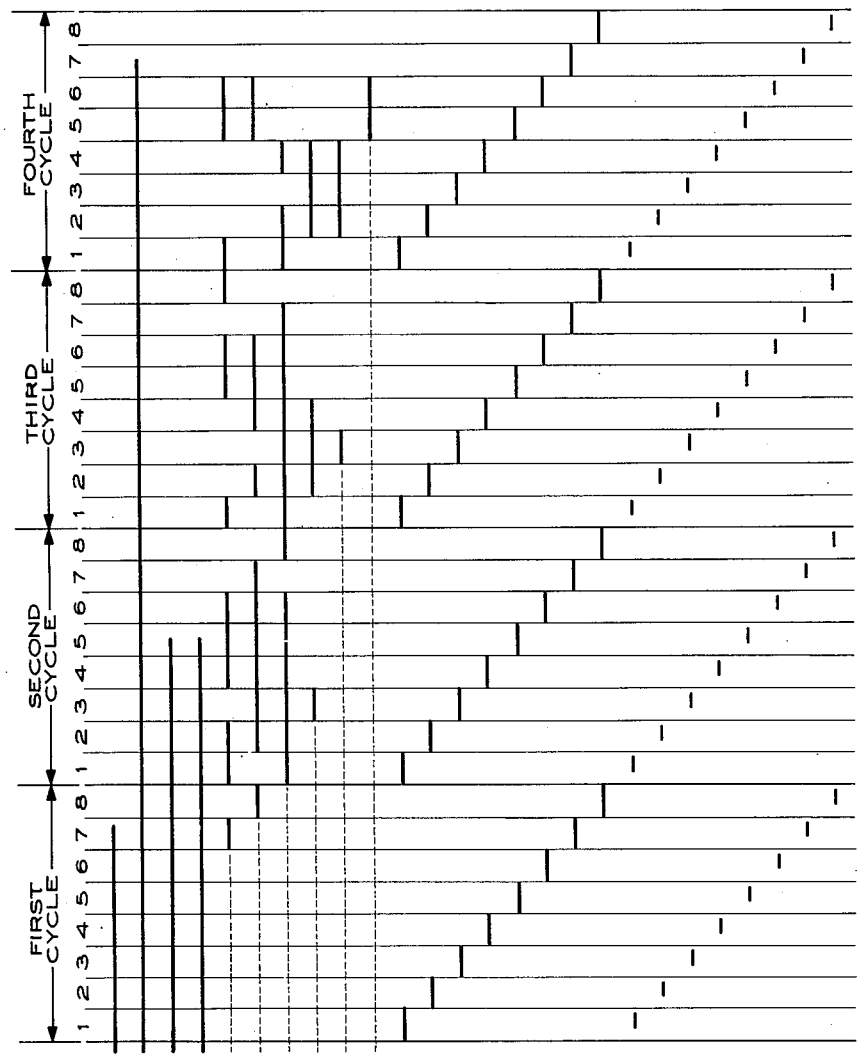
Figure 12:
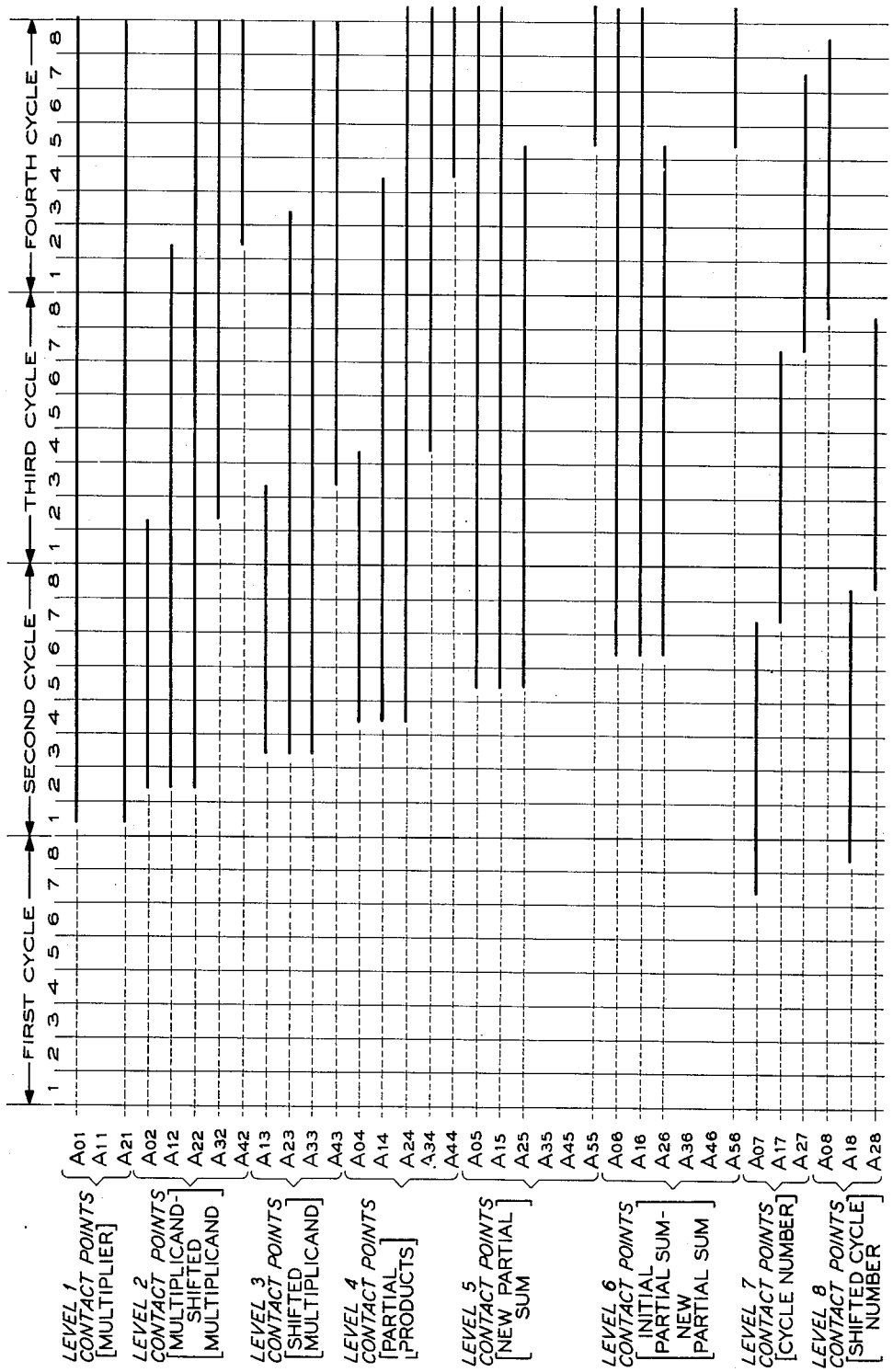

FIGURES 3A and 3B together form a schematic circuit diagram of a binary accumulator including a number of the bistable switching devices;

FIGURE 4 is a timing chart useful in understanding the operation of the accumulator of FIGURES 3A and 3B;

FIGURE 5 is a front elevation of typical combined relay coil and cam operated switching devices that may be employed in circuits such as the accumulator illustrated in FIGURE 3;

FIGURE 6 is a side elevation of the switching devices shown in FIGURE 5;

FIGURE 7 is a plan of the devices illustrated in FIGURE 5;

FIGURE 8 illustrates in block form a multiplier in accordance with the invention;

FIGURES 9A to 9H together form a schematic circuit diagram of the multiplier shown in FIGURE 8;

FIGURE 10 indicates the manner in which FIGURES 9A to 9H are connected to form the multiplier; and FIGURES 11 and 12 are timing charts showing the operating sequence of the elements found in the multiplier of FIGURE 9.

Figure 1:
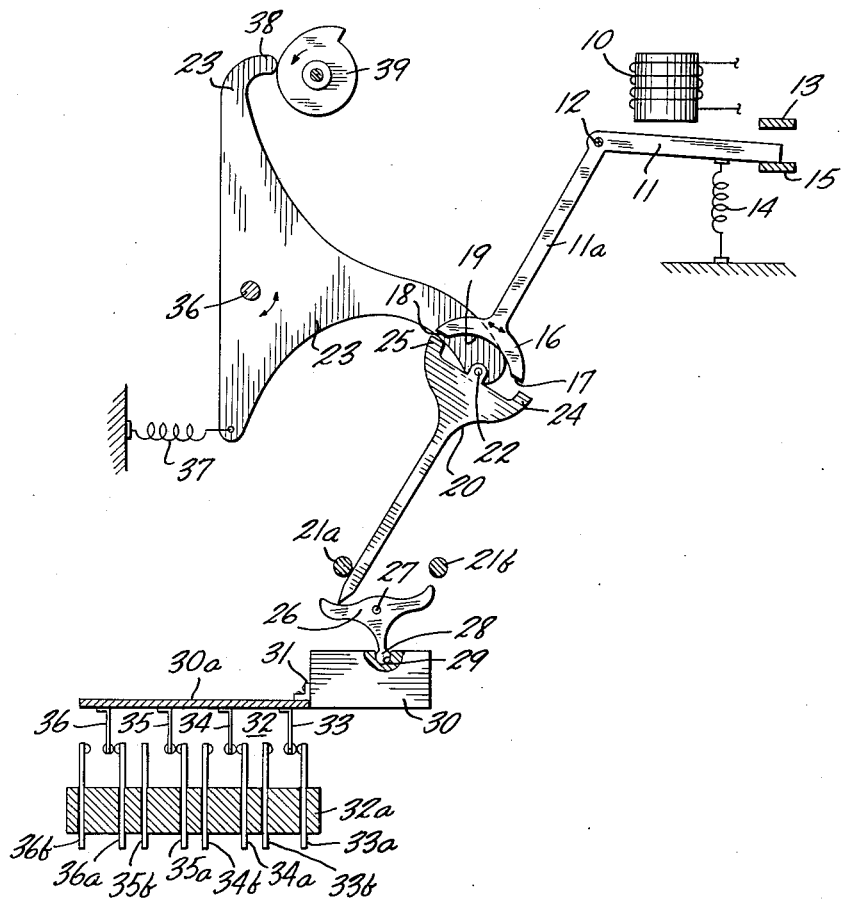
FIGURE 1 is a diagrammatic view of a combined relay coil and cam operated switching device illustrating the principles of operation of a typical bistable switching device in accordance with the present invention.

Referring to the invention in greater detail with particular reference to FIGURE 1, a relay coil 10 when energized actuates an armature 11, pivoted at point 12, against a stop 13, the armature normally being urged by a spring 14 against a stop 15. The coil 10 also actuates at least one other armature 11 (not shown) as will be discussed in greater detail below.

The armature 11 includes an armature extension 11a angularly oriented with respect thereto and carrying a C-shaped segment 16 having a pair of end projections 17 and 18 functioning as actuators and joined by an arcuate portion 19. Cooperating with the actuators 17 and 18 is a sword 20 pivoted to swing between stops 21a and 21b by a pin 22 fastened to a selector lever 23. The sword 20 is formed with laterally spaced arms 24 and 25 on one end which are separated a greater distance than the actuators 17 and 18 on the segment 16. The other end of the sword 20 engages an operating lever 26 pivoted at a fixed point 27, a ball 28 integral with the lever 26 being disposed in a suitable recess 29 in an arm 30 to couple these elements.

A nonconductive extension bar 30a is joined by a bracket 31 to the arm 30, switches 32 being formed by contact carrying arms 33, 34, 35 and 36 extending vertically from the bar 30a. Contact blades 33a, 33b, 34a, 34b, 35a, 35b, 36a and 36b, mounted in an insulated frame 32a, respectively cooperate with the arms 33, 34, 35 and 36 upon movement of the arm 30. Obviously, any desired number of contact arms and associated switch blades may be operated by the arm 30.

The selector lever 23 pivots on a fixed pin 36 and is urged clockwise by a spring 37 fastened to its lower end. The upper end of the lever 23 is formed with a cam follower 38 engaging a counterclockwise rotating selector cam 39.

In the operation of the switching device shown in FIGURE 1, rotation of the selector cam 39 may be initiated at any time and when its lobe engages the cam follower 38, the selector lever 23 will be rotated counterclockwise resulting in an upward displacement of the sword 20. If the relay coil 10 is energized at this time, the actuator 17 will strike the arm 24 on the sword 20 to swing it against the stop 21a. When the follower 38 leaves the cam lobe, the swing 37 will urge the selector lever 23 to its normal position and in so doing the sword 20 will pivot the operating lever 26 and shift the arm 30 and extension bar 30a to the right, as shown in FIGURE 1. This will close one set of switch contacts.

On the other hand, if the relay coil 10 is deenergized when the selector lever 23 is displaced from its normal position by engagement of the cam follower 38 with the cam lobe, the actuator 18 will engage the arm 25 and the sword will be swung against the stop 21b. The return of the selector lever 23 to its initial position will displace the operating lever 26 to move the bar 30a to the left and another set of switch contacts will be closed.

As mentioned above, the relay coil 10 simultaneously actuates a plurality of the armatures 11 or a structure equivalent thereto which cooperate with their respective swords 20 and selector levers 23 in the manner described above. However, the selector levers 23 are preferably sequentially operated by the cams 39 rotated in synchronism but having their lobes angularly spaced as will be understood from the below discussion of a register of the combined relay coil and cam operated switching devices.

Figure 2:
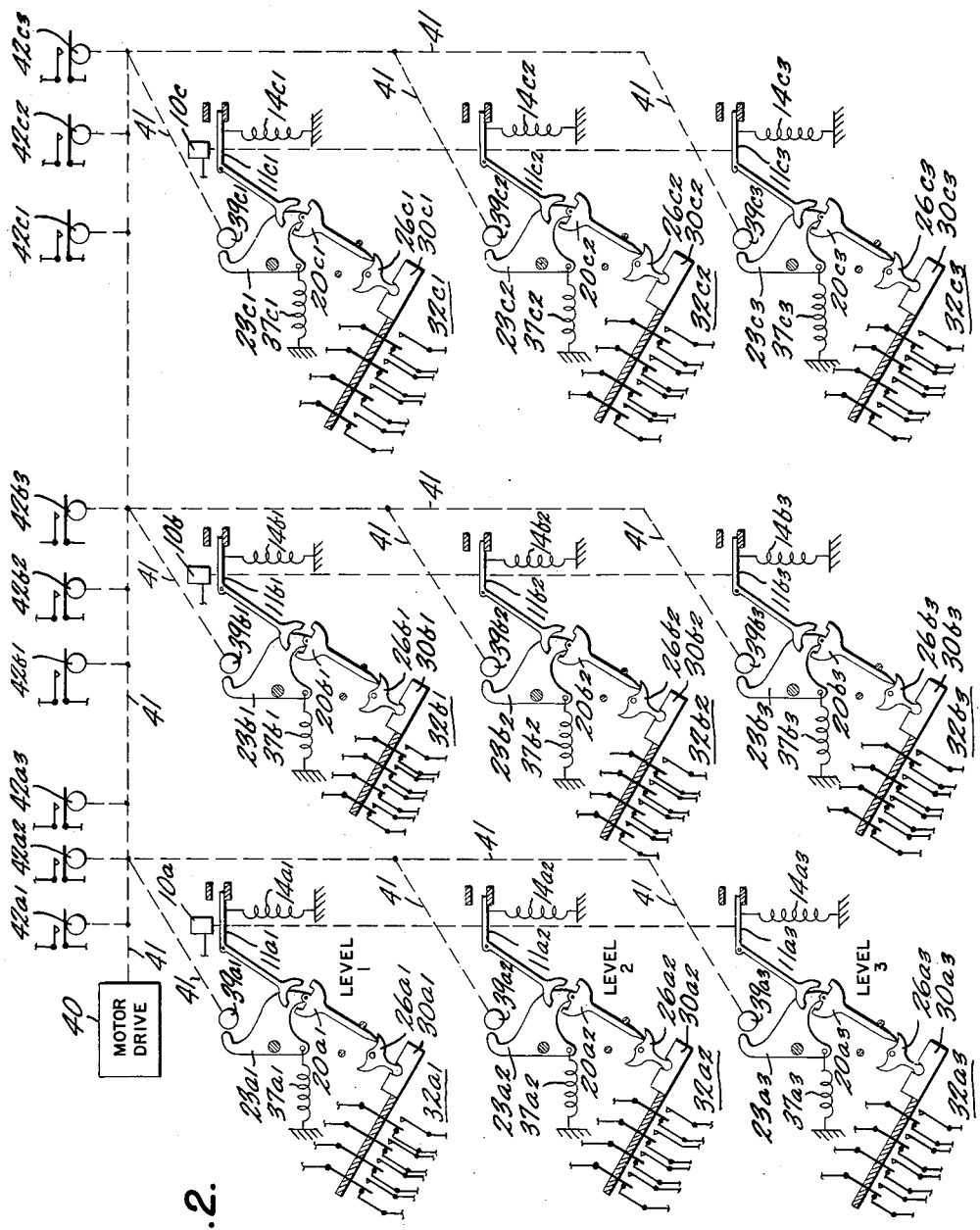
FIGURE 2 is a schematic circuit diagram of a matrix of the bistable switching devices that may be connected to form a variety of circuits.

Referring next to FIGURE 2, a plurality of the bistable switching devices are arranged in rows and columns to form a matrix having three levels. Associated with each switching device is a switch 32, a selector cam 39, a circuit breaker 42 and a relay 10. If the relay is energized at a time when the selector cam operates the device, it will be set to a position wherein all right contacts of the switch 32 are closed; this condition may be termed a "1" position or state; if the relay is de-energized at this time, all left contacts of the switch will be closed; this condition may be termed a "0" position or state. Of course, the matrix may be composed of any number of switching devices suitable for use in various arrangements in logical circuits using the binary notation. A motor drive 40 operates, through mechanical couplings 41, the selector cams 39 and circuit breakers 42 in a preselected timed relation.

More particularly, relay coils 10a, 10b and 10c respectively operate armatures $11_{a1}$, $11_{a2}$, $11_{a3}$; $11_{b1}$, $11_{b2}$, $11_{b3}$; and $11_{c1}$, $11_{c2}$ and $11_{c3}$. Each of these armatures is associated with a sword 20 and selector lever 23, these elements being similar to those illustrated in FIGURE 1 and designated by subscripts following the notation used in identifying the various armatures 11. Thus, the letter and number to the right of the reference numeral respectively indicate the binary code or digit position and the register level.

The selector cams 39 driven by the motor 40 may be arranged to actuate the selector levers 23 sequentially. For example, during one revolution of the mechanical drive shaft 41, the levers $23_{a1}$, $23_{a2}$ and $23_{a3}$ may be actuated in timed sequence by angularly spacing the lobes on the cams $39_{a1}$, $39_{a2}$ and $39_{a3}$ 120 degrees apart. Furthermore, the circuit breakers $42_{a1}$, $42_{a2}$ and $42_{a3}$ are operated simultaneously with the operation of the selector levers $23_{a1}$, $23_{a2}$ and $23_{a3}$, respectively. In this manner, operation of the switch contacts 32 occurs in a predetermined manner depending upon whether particular relay coils 10 are energized, this in turn being a function of the interconnection of the switching devices with the remaining elements and the incoming signals.

Considering the operation of a register of the bistable devices as shown in FIGURE 2, the relays 10 condition groups or columns of switching devices for operation and the selector cams 23 or operating means associated with each group or row of devices operate them. Any switching device in a conditioned column will, therefore, be operated to one of its stable states, since these devices are bistable, when the selector cams or operating means in the particular row in which the device is contained is made operable. The fact that the operating means makes each row of the switching devices operable at a unique cycle time allows the conditioning means to be energized at selective times without disturbing any bistable device except those which are made operable.

The circuit breakers 42 serve to isolate the conditioning means from all circuits not connected through the circuit breaker, these elements being operated at a unique cycle time in the same manner as the operating means. The function of the circuit breakers, therefore, is to connect various circuits to the conditioning means selectively while the operating means selectively operates various switching devices in accordance with this unique cycle time.

The above operating principles will be more fully understood after examining in detail a binary accumulator (FIGURES 3A and 3B) formed by a number of the bistable switching devices and associated elements, the various elements being similar to those shown and described in connection with FIGURE 2, these elements being suitably interconnected in order to provide the desired logical circuit. More particularly, it will be assumed that the accumulator is to be used with a four bit binary code. Therefore, the accumulator has four code or digit positions designated zero, first, second and third code positions. In addition, three armature levels are provided which function to store and transfer information, as will be described in detail below.

In FIGURES 3A and 3B, a conductor 45 is a source of operating potential and is coupled by an "add" switch 46, whihc initiates the operation of the accumulator, through a conductor 47 to a one revolution clutch 48. The motor 40, which may be selectivlye energized in any manner, is mechanically coupled through the clutch 48 to the mechanical drive 41 leading to the various circuit breakers 42 and selector cams 39, as pointed out in connection with FIGURE 2.

A conductor 49, energized upon closure of the "add" switch 46, is selectively connected to the circuit breakers $42_{a1}$, $42_{b1}$, $42_{c1}$ and $42_{d1}$ in accordance with four coded drums (not shown), for example, represented by switches 50a, 50b, 50c and 50d. The circuit breakers $42_{a2}$ and $42_{a3}$ are joined to the conductor 45 while only the circuit breakers $42_{b3}$ and $42_{d3}$ in the remaining code positions are tied thereto.

In view of the great number of connections between the switches 32 in each level of each code position and the remaining switches 32, as well as the connections to the relay coils 10 and the circuit breakers 42, each of the interconnecting conductors will not be identified by a reference numeral and to assist in understanding the invention, a typical operation of the binary accumulator will be described with reference to the timing chart illustrated in FIGURE 4. In this example, the binary increment 0111 is being added to the initial binary sum 1011.

Initially level 1 stores the binary input number while levels 2 and 3 store the initial sum. The contact points in the switches 32 of levels 1 and 3 are subsequently utilized to synthesize a conventional binary parallel adder whose output (the new sum) is transferred to level 2. The contact points of level 2 subsequently transfer the new sum to level 3.

Since the initial sum was assumed to be 1011, this will be stored in level 3 of the accumulator and the transfer switches $32_{a3}$, $32_{b3}$, $32_{c3}$ and $32_{d3}$ are positioned in FIGURES 3A and 3B in accordance with this number. The increment 0111 is then applied to the accumulator by the coded drums represented by the switches $50a$, $50b$, $50c$ and $50d$. This is indicated in the timing chart of FIGURE 4, the switches $50a$, $50b$ and $50c$ being closed throughout the 360 degree cam shaft rotation which is divided into three cycles. It will be understood that since "1" is signified by the presence of current in a circuit, the switch $50d$ remains open, "0" of course being indicated by the absence of current.

To initiate the first cycle of the accumulator, the add switch 46 is closed resulting in the energization of the one revolution clutch 48. As will be evident from the timing chart of FIGURE 4, the switch 46 is closed somewhat in excess of 120 degrees cam or drive shaft rotation or for a time greater than the duration of the first cycle. Since the circuit breaker $42_{a1}$ is closed during the first 120 degree rotation of the cam or drive shaft 41 as indicated in FIGURE 4, the grounded relay coil $10a$ will be energized by a circuit from the positive conductor 45 through the switch 46, the switch $50a$, the circuit breaker $42_{a1}$ and a conductor 51. Furthermore, since the circuit breakers $42_{b1}$ and $42_{c1}$ are closed during the first cycle and the switches $50b$ and $50c$ are also closed, the relay coils $10b$ and $10c$ will be similarly energized through conductors 52 and 53 from the conductor 49, which is tied by the switch 46 to the energized conductor 45.

It will be observed from the timing chart that the selector cams $39_{a1}$, $39_{b1}$, $39_{c1}$ and $39_{d1}$ actuate their associated selector levers $23_{a1}$, $23_{b1}$, $23_{c1}$ and $23_{d1}$ during a portion of the first cycle. Accordingly, towards the end of such actuation when the levers 23 are being returned to their initial positions by the bias springs 37, the arms $30_{a1}$, $30_{b1}$ and $30_{c1}$ will be moved to the right since the relays $10a$, $10b$ and $10c$ are energized, this action resulting in a "1" being stored in the first level at the zero, first and second digit positions. This is clearly illustrated in the timing chart, the switches $32_{a1}$, $32_{a2}$ and $32_{a3}$ being appropriately positioned in FIGURE 3. On the other hand, since the relay $10d$ remains deenergized, the arm $30_{d1}$ is shifted to the left so that a "0" is stored in the first level at the third code position.

It will now be understood that the increment 0111 has been stored in the first level during the first cycle of a complete accumulator operation, the rightward position of the arms 30 being representative of a "1" and the leftward position being representative of a "0". In addition, during this interval the initial binary number 1011 remains stored in the second and third levels, as indicated in FIGURES 3A and 3B and on the timing chart of FIGURE 4, since the corresponding selector cams 39 do not actuate their associated levers 23.

During the second cycle in the accumulator operation, the circuit breakers $42_{a2}$, $42_{b2}$, $42_{c2}$ and $42_{d2}$ are closed resulting in the energization of the grounded relay coil $10b$ through a path from the energized conductor 45 including a conductor $53a$, the circuit breaker $42_{a2}$, a conductor 54, the switch $32_{a1}$, a conductor 55, the switch $32_{a3}$, a conductor 56, the switch $32_{b3}$, a conductor 57, the switch $32_{b1}$, a conductor 58, the circuit breaker $42_{b2}$, and a conductor 59. Subsequently, the selector cams $39_{a2}$, $39_{b2}$, $39_{c2}$ and $39_{d2}$ actuate their associated levers 23. This results in, (1) a shift of the switch $32_{a2}$ from its "1" to "0" position since the relay coil $10a$ at this time is deenergized, (2) no change in the condition of the switch $32_{b2}$ since a "1" was already stored therein and the relay $10b$ is energized, (3) no change in the switch $32_{c2}$ since a "0" was stored therein and the relay $10c$ is deenergized, and (4) a shift from a "1" to a "0" in the switch $32_{d2}$ since the relay coil $10d$ is deenergized. Accordingly, at the end of the second cycle or 240 degrees of cam or drive shaft rotation, the sum binary numeral 0010 will be stored in the second armature level. Since the initial binary numeral was 1011 and the increment 0111 is being added thereto, it is apparent that a carry digit must be provided if the sum in the second armature level is to be accurate.

More particularly, in the present accumulator a "carry" output line 60 is energized, if necessary, during the second cycle as indicated on the timing chart of FIGURE 4. Since in this instance a carry digit is required, an energizing circuit for the "carry" line 60 is provided, the energized conductor 45 being joined to the conductor 60 through a circuit including the conductor $53a$, the circuit breaker $42_{a2}$, conductors 61 and 62, the switch $32_{b1}$, a conductor 63, the switch $32_{b3}$, conductors 64 and 65, the switch $32_{c1}$, a conductor 66, the switch $32_{c3}$, conductors 67 and 68, the switch $32_{d1}$, a conductor 69 and the switch $32_{d3}$. When the circuit breaker $42_{a2}$ is opened, the "carry" line 60 is, of course, deenergized.

In other words, the addition in the zero code position of $1+1$ produces a carry digit, the relay coil $10b$ being energized since the addition in the first code position of $1+1+$ a carry digit produces a sum digit. Furthermore, the addition in the first code position of $1+1$ produces a carry digit, independent of the state of the "carry" input line 56 or a "no carry" input line 70 to this stage, while the addition in the second code position of $1+0+$ a carry digit produces a carry digit. Finally, the addition in the third code position of $0+1+$ a carry digit produces a carry digit on the "carry" line 60. Obviously, in a different situation in which a carry digit need not be produced, one or more of the "no carry" lines 70, 65 or 74 would be energized.

At the beginning of the third cycle in the accumulator operation, the circuit breakers $42_{a3}$, $42_{b3}$, $42_{c3}$ and $42_{d3}$ are closed, as indicated on the timing chart of FIGURE 4, to initiate transfer of the new sum, stored in the second level at the end of the second cycle, to the third level. The selector cams $39_{a3}$, $39_{b3}$, $39_{c3}$ and $39_{d3}$ actuate their associated levers 23 part way through the third cycle and since the coil $10a$ is deenergized, the switch $32_{a3}$ will be shifted from a condition in which it stores a "1" to that in which it stores a "0." On the other hand, since the relay $10b$ is energized, actuation of the lever $23_{b3}$ by the cam $39_{b3}$ will not change the condition of the switch $32_{b3}$ which is in a "1" position. The switches $32_{c3}$ and $32_{d3}$ will also continue storing a "0" since their respective relay coils $10c$ and $10d$ remain deenergized.

In view of the foregoing, it is apparent that the binary numeral 0010 will be stored in the third level at the end of the third cycle, a carry output having been indicated on the conductor 60 during the second cycle. Therefore, the addition of the binary number 0111 (7) to the stored binary number 1011 (11) produces 0010 and a carry digit which represents a sum of eighteen.

Referring next to FIGURES 5, 6 and 7, combined relay coil and cam operated switching devices are illustrated that may be utilized in logical circuits such, for example, as the accumulator of FIGURES 3A and 3B. For clarity, the elements found in the switching devices similar to those shown in FIGURES 1, 2 and 3 will be designated by like primed reference numerals. The devices include a frame 75 carrying mounting screws 75a for attaching it to a suitable chassis. On the lower edge of the frame 75 is mounted a shaft 76 which carries a drive gear 77 suitably actuated by a gear on the chassis to which the relay is fastened, the gear 77 being keyed to three cams $39_{a1'}$, $39_{a2'}$ and $39_{a3'}$, the cams and drive gear being retained on the shaft 76 by a split collar 77a on its outer end. It will be evident that three identical mechanisms are actuated by each one of the cams $39_{a1'}$, $39_{a2'}$ and $39_{a3'}$. However, in the interests of brevity and clarity, only one of these mechanisms will be particularly described, it being understood that the other two function in a similar manner.

A selector lever 23' carries a cam follower finger 38' and is pivoted on a shaft 36' supported by an obliquely extending plate 78 fastened to the frame 75 by a pair of screws 79, suitable spacers 79a being provided to space the levers 23' from each other, the frame 75 and the plate 78. A restoring spring 37' is anchored by a pin 80 to the frame 75, its other end being fastened in an opening 81 in one leg of the selector level 23'. The other leg of the selector lever 23' carries an upwardly extending finger 82 having an insulating cap 83 slipped thereover to engage a lower spring finger 84 of a circuit breaker $42_{a1'}$. As will be evident from FIGURE 7, the three circuit breakers $42_{a1'}$, $42_{a2'}$ and $42_{a3'}$ each include a stationary switch arm 85 carrying a contact on its end cooperating with contacts on the spring fingers 84, these elements being horizontally mounted on a tab 86 of the frame 75 by means of insulating spacers 87, 88 and 89. All of the foregoing elements are held in their properly related positions by the means of screws 90. It should be noted that in this particular construction, the circuit breakers 42 will not be closed for as long an interval as required by FIGURES 3A and 3B. Obviously, additional mechanical elements may be coupled to the cam shaft 76 to actuate the circuit breakers as indicated on the FIGURE 4 timing diagram.

Returning to the selector lever 23', a sword 20' is pivoted at 22' on its other end, the sword being provided with upwardly extending projections 24' and 25' laterally displaced from the pivot 22'. The tip of the sword 20' is received by a notch 91 in a bell crank 92 pivoted on a shaft 93 on the other end of the supporting plate 78.

In order to retain the sword 20' in either one of two positions, an angled element 94 is provided on the pivot 22', one leg of the element 94 being fastened by a set screw 94a to the selector lever 23', the other end being provided with a slight protrusion 95 selectively received by dimples 96 or 97 on the sword 20'. It will be apparent that this construction will retain the sword 20' in either one of two positions unless urged with some force therefrom.

A relay coil 98 wound on a core 99 is supported by a yoke 100 fastened by screws 101 to the frame 75. A horizontal armature portion 102, shown as a unitary plate but which may, of course, be split into three sections, is integral with three vertical armature extensions 11a', this assembly forming three separate armatures actuated by energization of the coil 98. The plate 102 is biased away from the core 99 by a spring 103, the entire armature assembly being pivoted on a shaft 104 supported by flanges 105 extending from the yoke 100. Of course, a single unitary armature extension may be utilized in place of the extensions 11a, if desired. On the end of the armature extension 11a' is found a pair of laterally displaced end projections 17' and 18' carrying flanges 17a and 18a adapted to be selectively engaged by the projections 24' and 25' on the sword 20'.

A C-shaped finger 106 on the other end of the bell crank 92 engages an arm 30' which is fastened to an extension bar 30a' functioning to actuate a switch 32', the bar 30a' being supported by leftwardly biased switch armatures 33', 34', 35' and 36'. Rivets 107 attach the switch armatures to an insulated supporting piece 108 secured to a sub-frame 109 which is fastened by screws 110 to the frame 75. A screw 111 secures one end of leaf springs 112 to the sub-frame 109, the other end being provided with a C-shaped portion 113 received by the end of the extension bar 30a to bias this element to the left. As mentioned above, it is apparent that there will be three leaf springs 112 received by three extension bars 30a since three switch mechanisms are found on the switching device. A further sub-frame 114, secured by screws 115 to the frame 75, carries switch contacts 33a', 33b', 34a', 34b', 35a', 35b', 36a' and 36b' respectively engageable by the switch armatures.

The operation of the switching apparatus illustrated in FIGURES 5, 6 and 7 is very similar to that described in connection with FIGURE 1. Thus, as the drive gear 77 is rotated, one of the selector levers 23' will be actuated to cause the projections 24' and 25' on the sword 20' to be moved upwardly. If the relay coil 98 is deenergized as shown in FIGURE 5, the projection 24' on the sword 20' will engage the flange 17a' on the armature extension 11a' and urge the sword into the position shown on the drawing, the protrusion 95 being received by the dimple 96. Accordingly, when the cam follower 38' leaves the cam lobe, the sword 20' will move downwardly against the notch 91 on the bell crank 92, this action resulting in movement of the extension bar 30a' to the right so that the switch arms 33', 34', 35' and 36' engage the switch contacts 33a', 34a', 35a' and 36a', respectively.

On the other hand, if the relay coil 98 is energized when the cam follower 38' engages a cam lobe to move the sword 20' upwardly, the armature extension 11a' will be pivoted to the left so that the flange 18a' will engage the projection 25' on the sword 20' to rotate it clockwise and place the protrusion 95 in the dimple 97. Therefore, when the cam follower 38' leaves the cam lobe, the sword 20' will move downwardly but since its point has been moved to the left, it will not engage the bell crank 92. Therefore, the armatures 33', 34', 35' and 36' will, together with the leaf springs 112, urge the switch arm 30a' to the left so that the switches 32' will be in their other condition.

Coincident with each actuation of one of the selector levers 23', the corresponding insulating cap 83 on the finger 82 urges the spring finger 84 upwardly to close the circuit breaker contacts in one of the circuit breakers $42_{a1'}$, $42_{a2'}$ or $42_{a3'}$. Thus, the circuit breakers are mechanically coupled to the cams 39' as shown by the broken line coupling 41 in FIGURE 3.

There are many switching applications in which the combined relay coil and cam operated switching devices may be employed. Several typical uses in logical circuits will be summarized hereinafter with reference to charts pointing out in brief the function of each armature level in the particular system. In addition, a multiplier using the bistable devices will be described in some detail.

Considering first the binary accumulator described above with reference to FIGURE 3, this system employs a register of the switching devices and their use may be summarized as shown in the following chart.

*Accumulator Application*

| Armature Level | Quantity Stored | Use of Contact Points on Each Level |
|---|---|---|
| 1 | Conventional Binary Input Number. | Conventional Binary Parallel Adder. |
| 2 | New Sum | Binary Number Transfer Circuit Between Levels 2 and 3. |
| 3 | Initial Sum—New Sum | Conventional Binary Parallel Adder. |

The described accumulator system assumed that the input member was in conventional binary code. In an instance where the input number appears in reflected code, the accumulator may be summarized in the following chart.

*Second Accumulator Application*

| Armature Level | Quantity Stored | Use of Contact Points on Each Level |
|---|---|---|
| 1 | Reflected Binary Input Number. | Reflected to Conventional Binary Translator. |
| 2 | Conventional Binary Number. | Conventional Binary Parallel Adder. |
| 3 | New Sum | Binary Number Transfer Circuit Between Levels 3 and 4. |
| 4 | Initial Sum—New Sum | Conventional Binary Parallel Adder. |

The switching devices constructed in accordance with the principles of the present invention may also be employed in a simple adder system and the inputs, the addend and augend, will be assumed to be in the conventional binary code, a summary chart appearing as follows:

*Adder Application*

| Armature Level | Quantity Stored | Use of Contact Points on Each Level |
|---|---|---|
| 1 | First Input Number (Addend). | Conventional Binary Parallel Adder. |
| 2 | Second Input Number (Augend). | Do. |
| 3 | Sum | Binary Number Transfer Circuit Out of Level 3 (other possible uses dependent on Adder integration into over-all switching networks). |

Employing the same principles utilized in providing an accumulator application where the inputs are assumed to be in reflected binary code, an adder system with such an input may be summarized in the following chart.

*Second Adder Application*

| Armature Level | Quantity Stored | Use of Contact Points on Each Level |
|---|---|---|
| 1 | First Input Number (Addend) in Reflected Binary Code. | Reflected to Conventional Binary Translator. |
| 2 | Added in Conventional Binary Code. | Conventional Binary Parallel Adder. |
| 3 | Second Input Number (Augend) in Reflected Binary Code. | Reflected to Conventional Binary Translator. |
| 4 | Augend in Conventional Binary Code. | Conventional Binary Parallel Adder. |
| 5 | Sum | Binary Number Transfer Circuit out of Level 3. |

If desired, the special purpose relays may also be employed in a multiplication system in which the multiplier and multiplicand are in conventional binary code. This system is summarized in the following chart.

*Multiplier Application*

| Armature Level | Quantity Stored | Use of Contact Points on Each Level |
|---|---|---|
| 1 | Multiplier | Choice of Path Between Levels 2 and 4. |
| 2 | Multiplicand — Shifted Multiplicand. | One Place Shift and Transfer to Level 3—Transfer to Level 4. |
| 3 | Shifted Multiplicand | Transfer to Level 2. |
| 4 | First Partial Product—Second Partial Product—Third Partial Product. | Conventional Binary Parallel Adder. |
| 5 | New Partial Sum | Transfer to Level 6. |
| 6 | Initial Partial Sum—New Partial Sum—Product. | Conventional Binary Parallel Adder. |
| 7 | Cycle Number | One Place Shift and Transfer to Level 8 Choice Path Between Levels 2 and 4. |
| 8 | Shifted Cycle Number | Transfer to Level 7. |

In the multiplier a number of switching cycles are performed within the overall machine cycle in order to perform the various operations necessary for multiplication. Thus, the multiplying system summarized above is designed to perform the process of multiplication by a partial product summation and eight code levels are utilized. The first cycle in the multiplier is for control purposes while the second, third and fourth cycles actually perform and complete the multiplication process. After the product has been produced in the four cycles indicated above, the binary multiplier is read for its next operation.

Referring to the multiplier of FIGURES 8 and 9 in greater detail, the various elements forming this apparatus are similar to those shown and described in connection with FIGURES 2, 3A and 3B, these elements being suitably interconnected to provide the desired logical circuit.

The operations necessary to multiply a binary multiplicand 111 by a binary multiplier 101 are as follows:

```
    111    multiplicand
    101    multiplier
    ---
    111
    000    partial products
    111
    ------
    100011 sum
```

In the apparatus of FIGURES 8 and 9, the binary words are registered in a reverse order to that ordinarily used because of the physical orientation of the equipment. Therefore, shifting to the left in an arithmetic operation corresponds to shifting to the right in the physical apparatus. The multiplication of the two binary words 101 and 111 in this multiplier is accomplished as follows:

Using the lowest order digit of the multiplier "1";

```
1   111    multiplicand
2   101    multiplier 3   111    first partial product
4   0000   initial partial sum 5   1110   new partial sum
```

Using the next progressively higher order digit of the multiplier "0";

```
6      000    second partial product
7 (5)  1110   initial partial sum 8      1110   new partial sum
```

And finally, using the next progressively higher order digit of the multiplier "1";

```
9       00111   third partial product
10 (8)  1110    initial partial sum 110001  new partial sum (product)
```

Since the binary numbers progress from left to right in the multiplier instead of right to left, it can be seen that the number 110001 is the same as 100011 written conventionally.

In multiplying the above two numbers, it can be seen that each time there is a binary "1" in the multiplier, the multiplicand is registered as a partial product. For each succeeding digit in the multiplifier the multiplicand is shifted so that when a partial product is registered for a digit "1" in the multiplier, such product will be the multiplicand multiplied by a number representative of the digit place of the digit "1."

The multiplier apparatus shown in FIGURE 8 functions to perform the above operations. The input multiplier number is stored in a unit designated a multiplier (level 1) and the input multiplicand is stored in a unit labeled multiplicand (shifted multiplicand, level 2). The latter unit stores the multiplicand at a first time and at subsequent times stores the shifted multiplicand. The unit labeled shifted multiplicand (level 3) cooperates with the multiplicand unit to shift the number stored in the latter unit one place to the right and transfers the shifted number back thereto. The unit labeled cycling apparatus (levels 7, 8) performs the function of determining which of the multiplier digits will be effective and controls the multiplying apparatus so that it runs through the correct number of cycles.

The apparatus contained in each of the boxes functions in a time sequence so that at a time $t_1$, the multiplier unit will register the input multiplier; at a time $t_2$, the multiplicand unit will register the input multiplicand, or, in a later cycle, register the shifted multiplicand from the unit labeled shifted multiplicand; at a time $t_3$, the unit labeled shifted multiplicand will register a multiplicand stored in the multiplicand unit and will shift the multiplicand one place to the right; at times $t_4$, $t_5$ and $t_6$ a unit designated an accumulator (levels 4, 5 and 6) will register the number stored in the multiplicand unit and add to this number any previously stored number; and at times $t_7$ and $t_8$ the cycling apparatus will operate and connect various stages of the multiplier unit to the multiplicand unit.

The cycling unit connects a source of potential to each stage of the multiplier unit representative of a multiplier digit and dependent upon whether the stage is open or closed, this being determined by whether the digit stored is a "0" or "1." Therefore, a potential is not or is connected to the multiplicand unit stages in parallel, the stages furnishing a multiplicand to the accumulator unit.

Since it is necessary to test each multiplier digit to determine whether it is a "0" or a "1," the multiplying apparatus must run through at least as many cycles as there are multiplier digits. For the purpose of control; i.e., to set up necessary circuits, the multiplying apparatus runs through an extra cycle at the beginning of each multiplying operation.

Before proceeding with a detailed description of the apparatus shown in FIGURES 9A to 9H, it will be helpful to describe the general features of this circuit common to all of the bistable switching devices. Associated with each switching device designated SD is a switch A, a selector cam SC, a circuit break CB, and a relay AR. As discussed above, if the relay is energized at a time when the selector cam operates the device, it will be set to a position wherein all right contacts of the switch A are closed; this condition will be called a "1" position or state; if the relay is deenergized at this time, all left contacts of the switch A, if any are present, will be closed; this condition will be called a "0" position or state. The circuit breaker CB functions to complete a circuit through the relay during the time interval the selector cam SC operates the switching device SC, as may be observed in the timing chart of FIGURE 11.

The timing charts of FIGURES 11 and 12 indicate the sequence of operations in the multiplying system, the notation used therein being followed in FIGURE 9. Thus, the subscripts following the relay designation R refer to the binary code or digit position and the subscripts used with the circuit breakers CB and selector cams SC refer to the binary code position and operative time interval, respectively, the letter M being used where all of the circuit breakers and selector cams of a particular level are designated. The subscripts to the right of the switches A indicate the code position and level, respectively.

Figure 9A:
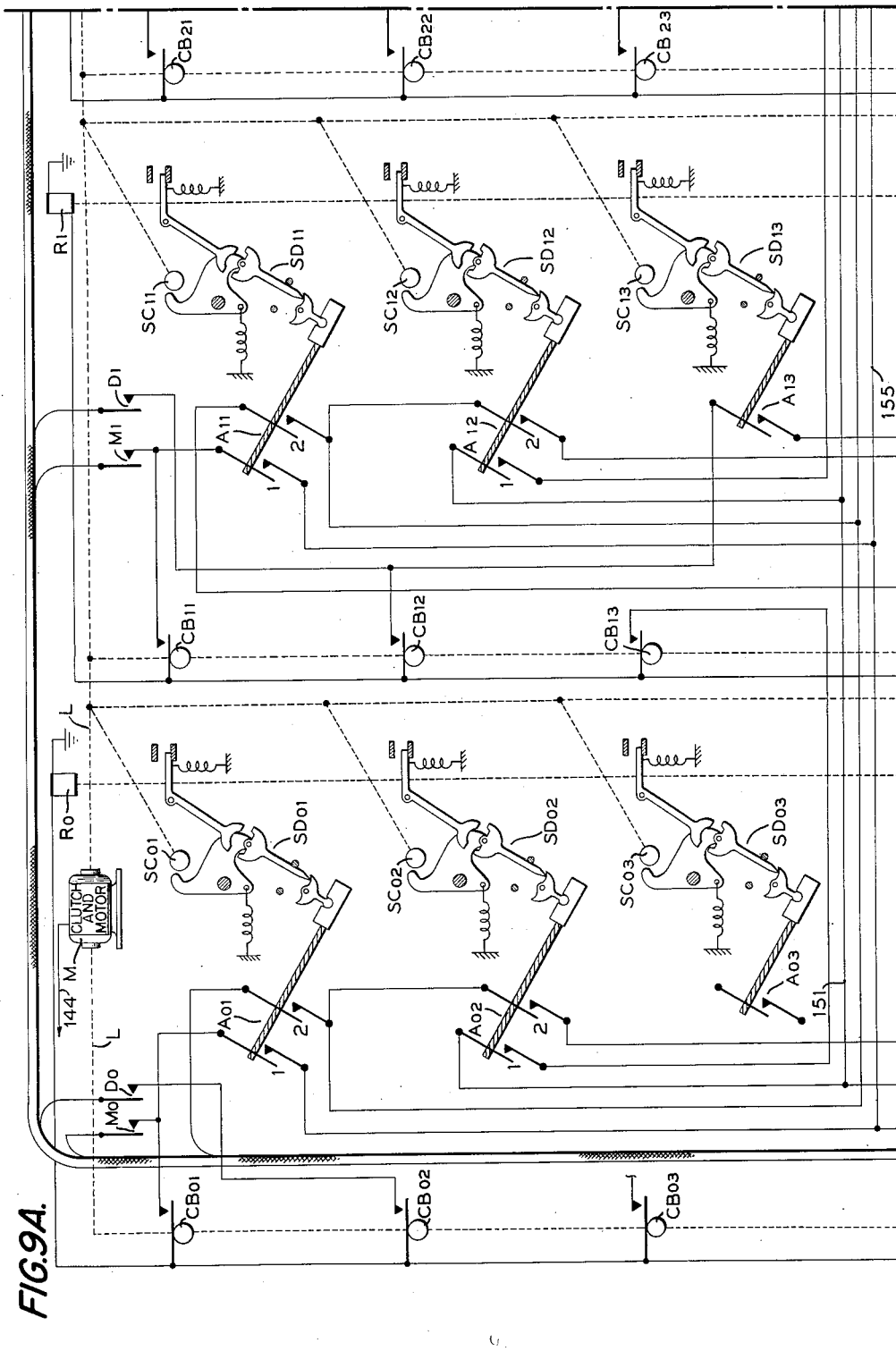
Figure 9B:
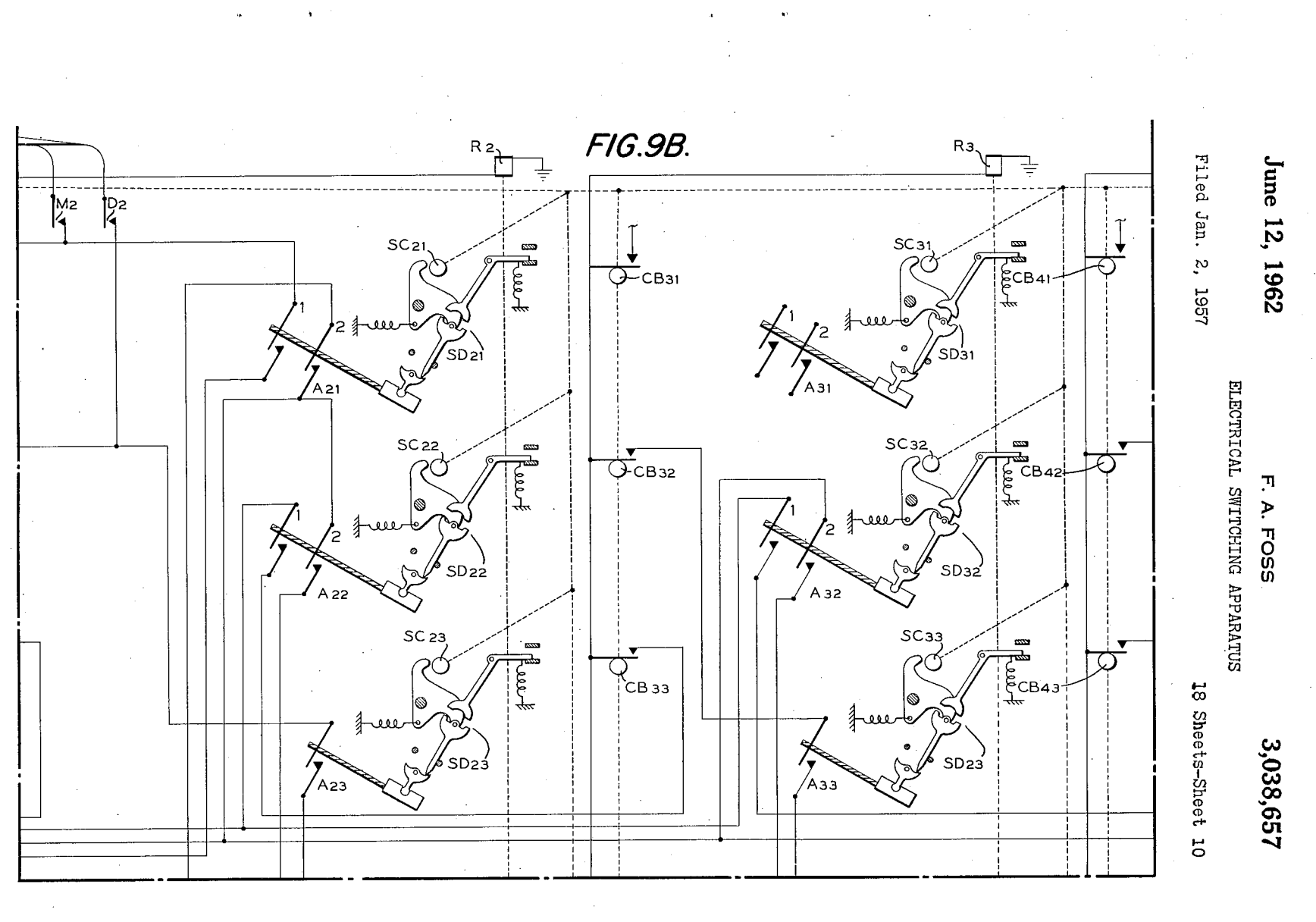
Figure 9C:
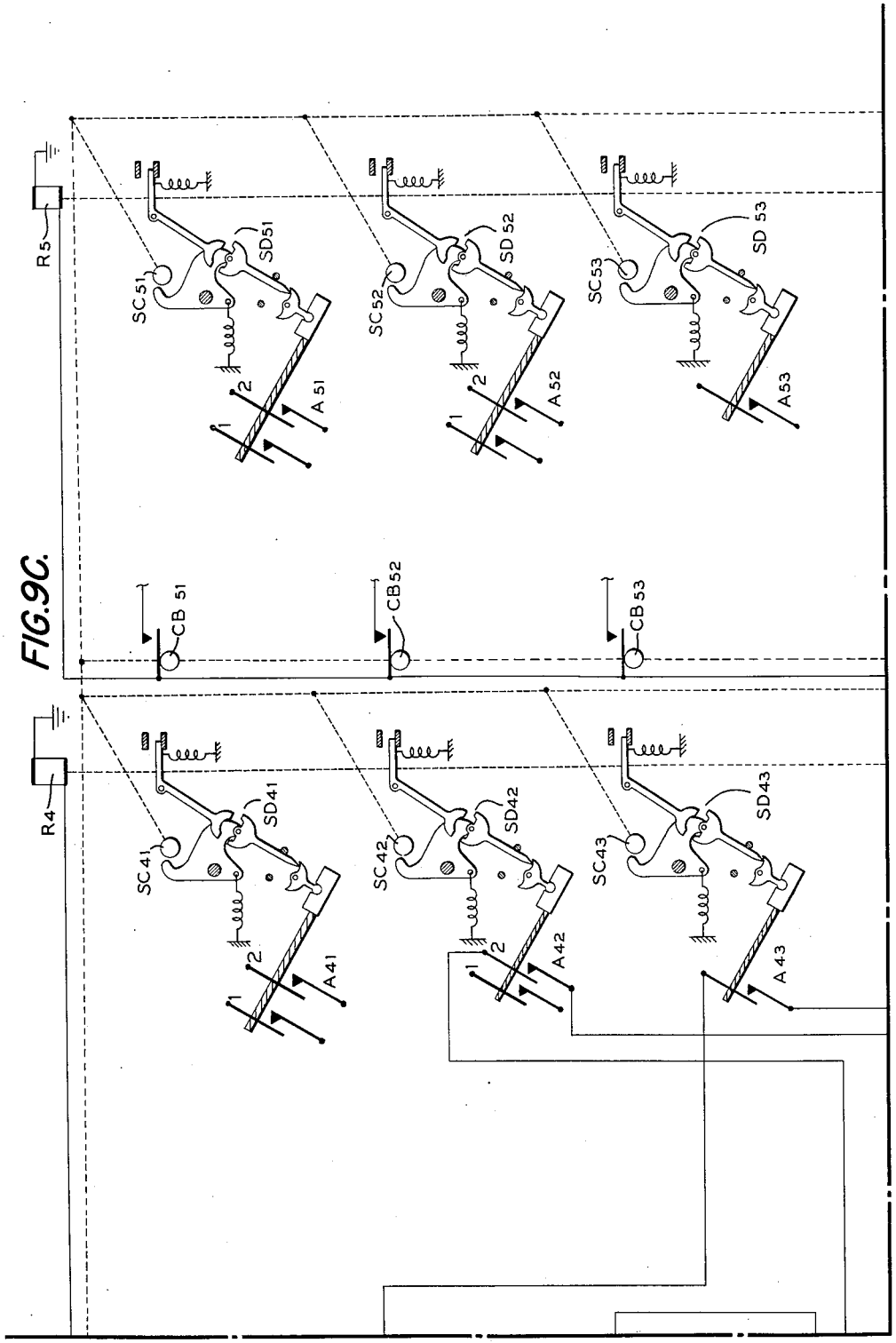
Figure 9D:
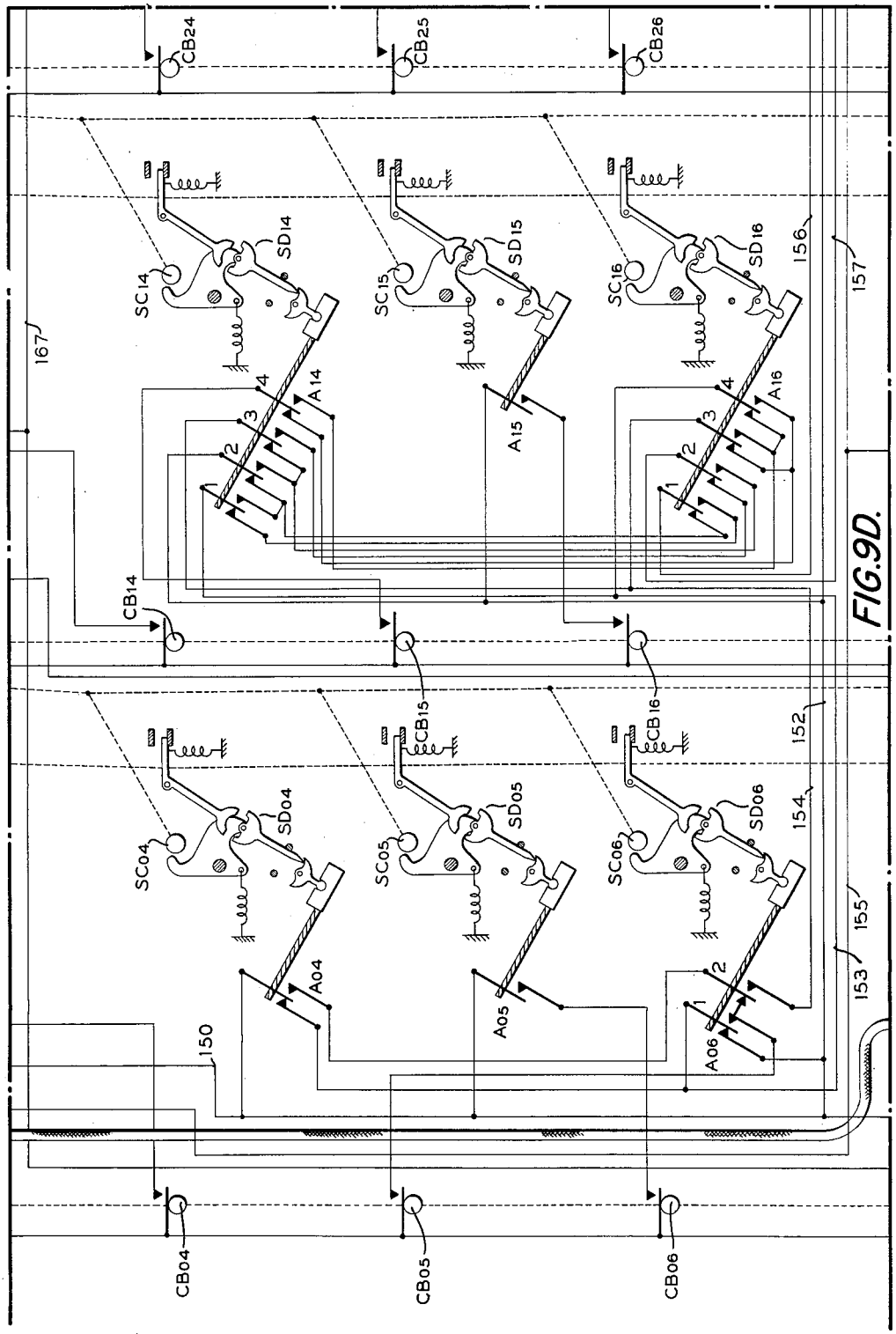
Figure 9G:
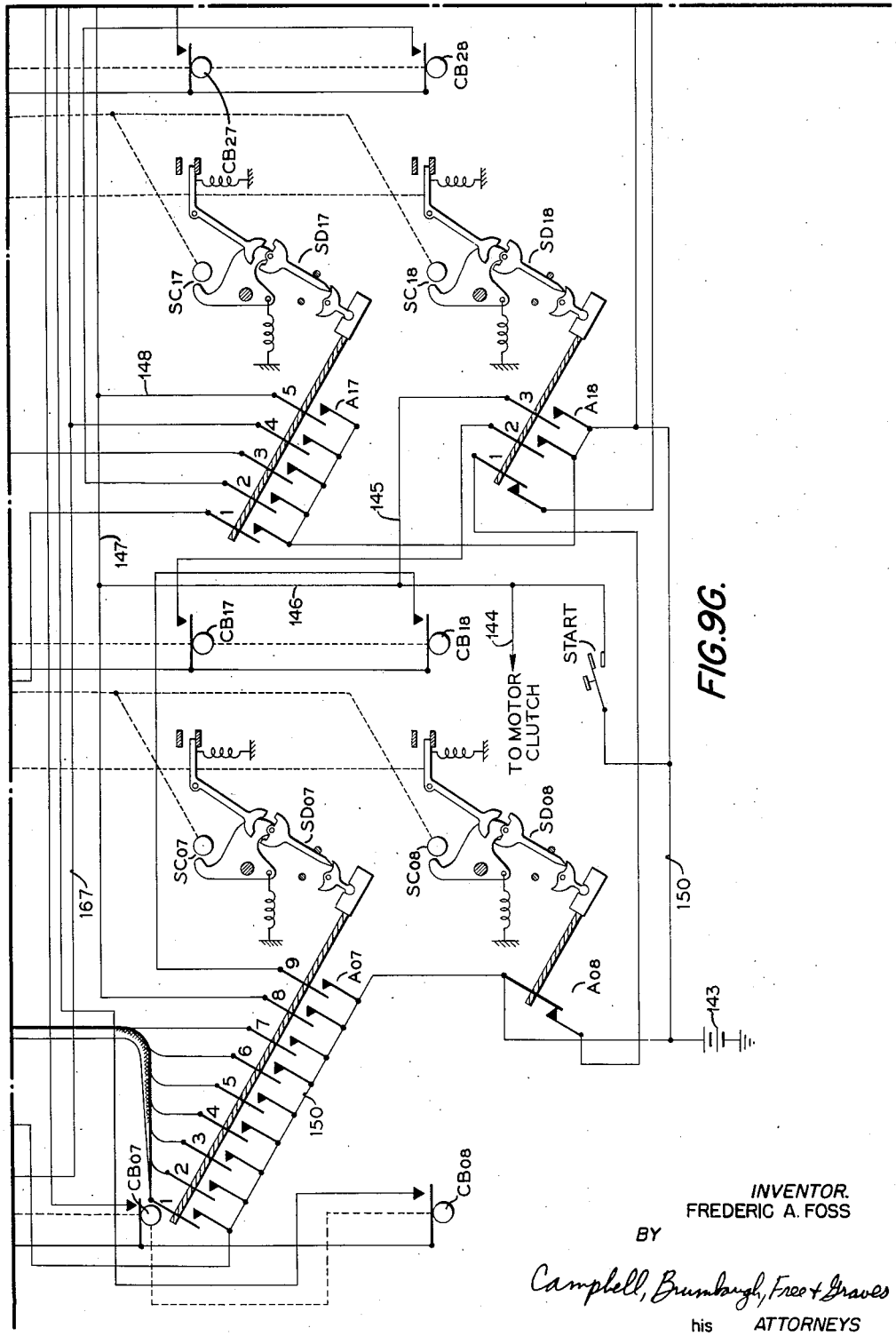
Figure 9H:
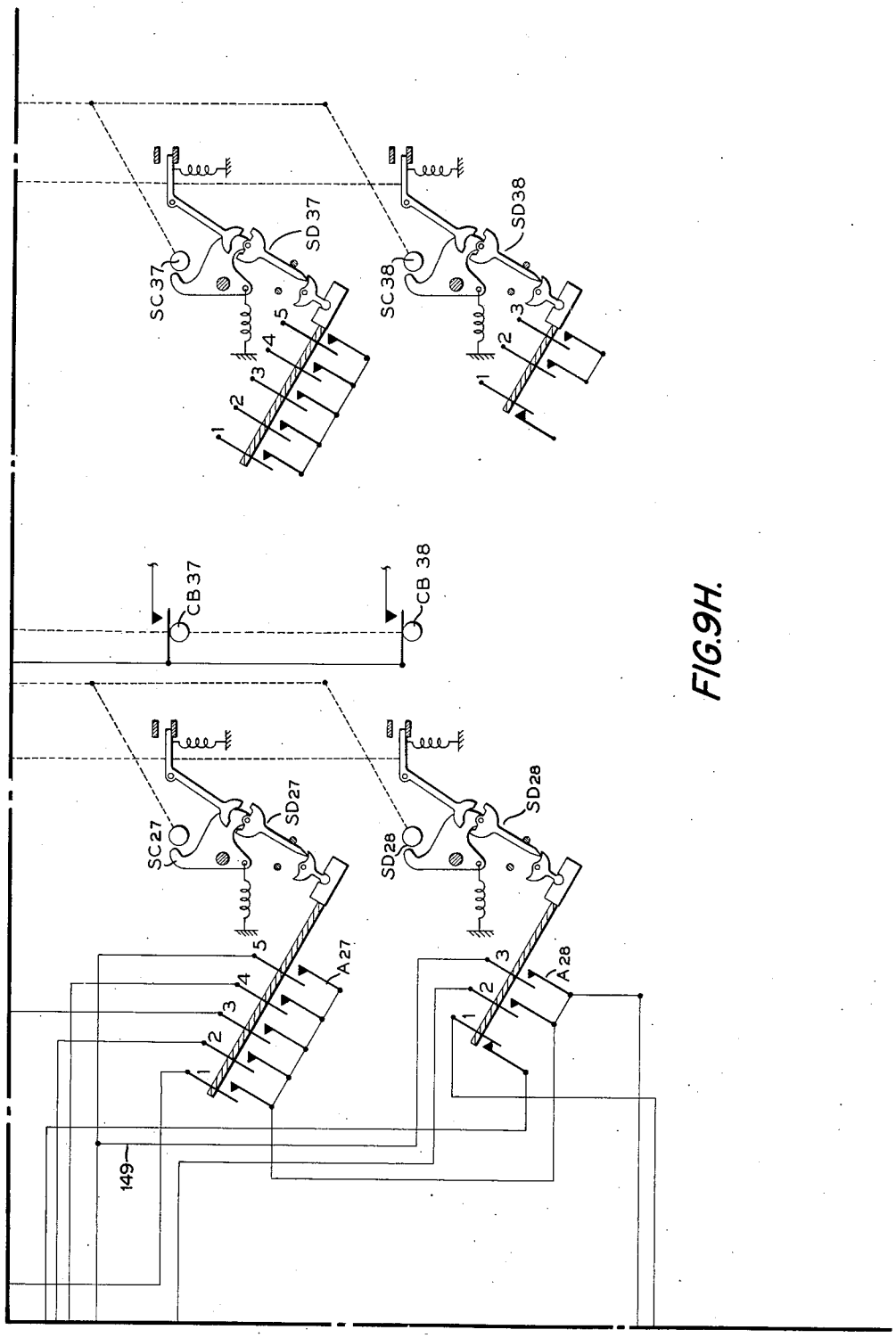

The clutch and motor combination M, diagrammatically illustrated in FIGURE 9A, is energized to rotate via a mechanical linkage L the selector cams SC and circuit breakers CB through a number of cycles equal to the number of digit positions in the input multiplier plus one control cycle.

All circuit breakers CB of any given digit order are connected in parallel to ground through the relay R associated with such order. An operating potential is applied to each individual circuit breaker CB according to the function of the switching device SD with which it is associated. Thus, closure of the circuit breaker contacts results in the application of such operating potential to a relay R and the switching device associated with the circuit breaker CB is set to a "1" position.

Since each individual switching device SD is set to "1" or "0" position in accordance with whether a potential is applied to its associated circuit breaker CB when the device is operated by its associated switching cam SC, it is unnecessary to state repeatedly in the following description that each circuit breaker CB controls a relay R which actually does the setting. In many instances, the description of a particular switching device SD has been terminated at the associated circuit breaker CB with a statement that it has been set to a "1" or "0" position.

Considering the operation of the multiplier circuit broadly, it is evident that the relays R condition the groups or columns of switching devices SD for operation and the selector cams SC or operating means associated with each group or row of devices operate them. Any switching device SD in a conditioned column will, therefore, be operated to one of its stable states, since these devices are bistable, when the selector cams SC or operating means associated with the particular row in which the device is contained is made operable. The fact that the operating means makes each row of the switching devices SD operable at a unique cycle time allows the conditioning means to be energized at selective times without disturbing any device except those which are made operable.

The circuit breakers CB serve to isolate the conditioning means from all circuits not connected through the circuit breaker, these circuit breakers being associated with a unique cycle time in the same manner as the operating means. The function of the circuit breakers CB, therefore, is to connect various circuits to the conditioning means selectively while the operating means selectively operates various switching devices SD in accordance with this unique cycle time.

With the above explanation in mind, the details of the specific operation of the various circuits should be readily understood since each of them depends upon the unique cycle time associated with each individual row to separate the switching devices SD common to each relay R or conditioning means from one another.

The components of the multiplier shown in block form in FIGURE 8 are each identified by levels designated in FIGURES 9A to 9H by the second subscript of each switching devise SD, the first subscript indentifying the binary code position. In the circuit as drawn the levels are in rows which progress from top to bottom when the drawings are assembled as shown in FIGURE 10.

It will be observed that some of the switching devices SD are not connected into the circuit, these being illustrated for the purpose of indicating that the capacity of the apparatus may be extended by connecting them as desired.

In describing this apparatus, the binary numbers 101 and 111 will be used as the multiplier and the multiplicand, respectively. Each switching device SD in each level is similar to the devices previously described and no designation of these devices has been made except as to its individual location in the system. The multiplying apparatus will be run through a number of cycles equal to the number of digits in the multiplier plus one. A cycle of operation is denoted by the total time that it takes the eight circuit breakers CB to operate in sequence.

Operation of the multiplier is initiated by closing a start switch (FIGURE 9G) momentarily to close a circuit to the clutch and motor combination M. To operate the linkage L through the required number of cycles, a connection is made to the clutch and motor M from a conductor 150 (FIGURE 9G) energized by a battery 143 through one contact of the level 7 and 8 switching devices $SD_{07}$, $SD_{17}$, $SD_{18}$, $SD_{27}$ and $SD_{28}$ in the cycling apparatus and conductors 144 to 149. These contacts are paralleled and in series with the clutch and motor M so that as long as the start switch or one switching device SD in the cycling apparatus is set to a "1" position, the clutch will be energized, as indicated in FIGURE 11, and the motor M will continue to rotate the linkage L. At the termination of the multiplication operation all switching devices SD will be in a "0" state with the parallel contacts open. Accordingly, the linkage L will cease rotation.

In an initial state where the multiplier contains no indications, all of the switching devices SD will be in a "0" position and the only circuit which is complete will be the circuit from the battery 143 through a closed contact of the switch $A_{08}$, contact 1 of the switch $A_{18}$ and contact 1 of the switch $A_{28}$ to the circuit breaker $CB_{07}$. The first cycle of the multiplier apparatus is for control purposes and performs no function aside from setting up the system so that the multiplier and multiplicand digits may be entered.

At a time $t_7$ in the first or control cycle the circuit breaker $CB_{07}$ will be closed (FIGURE 11) to complete a circuit to the relay $R_0$ which operates the switching device $SD_{07}$. Thereafter, the switching cam $SC_{07}$ will set the device $SD_{07}$ in a "1" state and close the contacts of the switch $A_{07}$. The switching device $SD_{07}$ when in its "1" position will furnish potential from the battery 143 through contact 9 of the switch $A_{07}$ to the circuit breaker $CB_{18}$ and through contacts 1 to 6 to the input switches M and D having their code positions identified by appropriate subscripts. Potential will also be supplied to the contact points of the switch $A_{01}$ of the switching device $SD_{01}$, open at this time, through the input switch $M_0$ and contact 7 of the switch $A_{07}$.

At a time $t_8$, when the circuit breakers CB in the eighth level are effective, a circuit will be completed through $CB_{18}$ and the contact 1 of the switch $A_{07}$ which will set the switching device $SD_{18}$ to a "1" or closed position. Consequently, the contact 1 of the switch $A_{18}$ will be opened to break the circuit through the circuit breaker $CB_{07}$ and contact 2 will close to make a circuit to the circuit breaker $CB_{17}$. Since the circuit breakers in level 7 are ineffective at this time, no action will occur.

By means not shown, the switches $M_0$, $M_1$ and $M_2$ will be set to represent the multiplier number with a closed position of a switch representing a "1." The lowest order digit controls $M_0$ and the successive digits control $M_1$ and $M_2$. Since the multiplier number in this instance is 101, $M_0$ and $M_2$ will be closed. The switches D will all be closed to represent the multiplicand 111 in a similar manner.

While the switches M and D are shown as being mechanical, it is obvious that the means by which they are operated is a matter of choice and could be manual or automatic, mechanical or electric or any combination thereof.

During times $t_1$ and $t_2$ of the second cycle, the multiplier and multiplicand are registered in the first and second levels, respectively, by reason of potential being applied through contacts 1 to 6 of the switch $A_{07}$ to the switches M and D. During the time $t_1$, potential applied through contacts 1 to 6 of the switch $A_{07}$, the input switches $M_0$ and $M_2$ to the circuit breakers $CB_{01}$ and $CB_{21}$ causes the switching devices $SD_{01}$ and $SD_{21}$ to operate and indicate the binary word 101.

During the time $t_2$, the multiplicand digits 111, represented by the closed input switches $D_0$, $D_1$ and $D_2$, will be registered in the switching devices $SD_{02}$, $SD_{12}$ and $SD_{22}$ since the circuit breakers $CB_{02}$, $CB_{12}$ and $CB_{22}$ are energized (FIGURE 11). With the switching devices $SD_{02}$, $SD_{12}$ and $SD_{22}$ in level 2 in their "1" state or closed, contact 1 of the switches $A_{02}$, $A_{12}$ and $A_{22}$ will furnish potential from the battery energized conductors 150 and 151 to the circuit breakers $CB_{13}$, $CB_{23}$ and $CB_{33}$, respectively, so that during the time $t_3$, when the circuit breakers in the third level are closed, the devices $SD_{13}$, $SD_{23}$ and $SD_{33}$ will be actuated to a "1" position by the relays $R_1$, $R_2$ and $R_3$. Accordingly, by connecting the circuit breakers CB of level 3 to lower order switch contacts of level 2, the indication registered in level 2 will be shifted when transferred to level 3. Then in the following third cycle during time $t_2$, by connecting the second level circuit breakers $CB_{12}$, $CB_{22}$, $CB_{32}$ and $CB_{42}$ to the third level switches $A_{13}$, $A_{23}$, $A_{33}$ and $A_{43}$ the indication registered in level 3 will be shifted back to level 2 multiplied by a factor 2 as a result of its shift to the right in level 3. The shifted multipilcand is then available in level 2 for later transfer to levels 3 and 4.

Each contact 2 of the switches A in level 2 is also connected to contact 2 of the corresponding switches A in the same digit position in level 1. In addition, each contact 2 of the switches A in level 2 is connected to the circuit breaker CB of the same digit position of level 4. These circuit connections function to apply potential to the contacts 2 of level 2 from the cycling apparatus in accordance with the digit place of the multiplier in level 1 which is to be effective. Further, a connection is completed from each actuated multiplicand switching device of level 2 to level 4 which is the input level of the accumulator.

The switching device $SD_{07}$ was set at time $t_7$ in the first cycle and $A_{07}$ closed. Potential is furnished through contact 7 of the switch $A_{07}$ to contact 2 of the switch $A_{01}$ to the contacts 2 of all switches in the second level. Accordingly, the circuit breakers $CB_{04}$, $CB_{14}$ and $CB_{24}$ associated with the switching devices in the fourth level close, the relays $R_0$, $R_1$ and $R_2$ will be energized if the switching device $SD_{01}$ is set to a "1" position. Since the first digit in the multiplier was a "1", potential is applied through contact 2 of the switch $A_{01}$ to contact 2 of the switches $A_{02}$, $A_{12}$ and $A_{22}$ to the fourth level circuit breakers $CB_{04}$, $CB_{14}$ and $CB_{24}$, respectively. Since these circuit breakers are closed during actuation of the fourth level selector cams at time $t_4$ of the second cycle, the relays $R_0$, $R_1$ and $R_2$ function to set the switching devices $SD_{04}$ $S_{14}$ and $SD_{24}$ to indicate the multiplicand 111 stored in level 2.

During the time $t_5$ in the second cycle, the circuit breakers in the fifth level are closed. Since the switching devices $SD_{04}$, $SD_{14}$ and $SD_{24}$ are set to a "1" position, they complete circuits from the source of potential 143 to the circuit breakers $CB_{05}$, $CB_{15}$ and $CB_{25}$. More particularly, the battery potential is coupled through the line 150, right contact of the switch $A_{04}$, left contact 2 of the switch $A_{06}$ to the circuit breaker $CB_{05}$. Such potential is also coupled from the line 150 through a line 152, left contact 1 of the switch $A_{06}$, a line 153, left contact 4 of the switch $A_{16}$, right contact 4 of the switch $A_{14}$ to the circuit breaker $CB_{15}$. Finally, potential for the circuit breaker $CB_{25}$ is supplied from the line 153, energized from the line 152, left contact 1 of the switch $A_{06}$, right contact 1 of the switch $A_{14}$, left contact 1 of the switch $A_{16}$ to a line 156, left contact 4 of the switch $A_{26}$ and right contact 4 of the switch $A_{24}$.

During the time $t_5$ in the second cycle when the now energized fifth level circuit breakers are operative, the relays $R_0$, $R_1$ and $R_2$ will be operated and the fifth level switching devices $SD_{05}$, $SD_{15}$ and $SD_{25}$ set to indicate the binary number 111. The single contacts of the fifth level switches $A_{05}$, $A_{15}$ and $A_{25}$ make circuits from the battery 143 via conductors 150 and 152 to the circuit breakers $CB_{06}$, $CB_{16}$ and $CB_{26}$ of level 6 so that during a time $t_6$ in the second cycle, when the sixth level switching devices are conditioned by the selector cams, the relays $R_0$, $R_1$ and $R_2$ will be energized according to the indication contained in the fifth level and the sixth level will be set to store an indication 111.

It will be recalled that in the previous cycle the switching device $SD_{18}$ operated to break the circuit to the circuit breaker $CB_{07}$ and close a circuit to the circuit breaker $CB_{17}$. Therefore, during the instant time $t_7$, operation of the selector cam $SC_{07}$ sets the switching device $SD_{07}$ to a "0" position, since the relay $R_0$ is not energized, and operation of selector cam $SC_{17}$ sets the switching device $SD_{17}$ to a "1" position since the relay $R_1$ is energized through the circuit breaker $CB_{17}$ and contact 2 of the switch $A_{18}$. A circuit is then completed from the battery 143 through the conductor 150 and contact 1 of the switch $A_{17}$ to contact 2 of the switch $A_{11}$. This circuit serves the same purpose as the circuit including switch contact 2 of the switch $A_{01}$; i.e., it determines whether the indication of the multiplier for the second digit is a "1" or a "0." If the indication is a "0" as in the present example, there will be an open circuit at contact 2 and no potential will be supplied to the multiplicand contained in level 2. Therefore, all "0's" are transferred to level 4 as the second partial product.

With the switching device $SD_{17}$ in a "1" state, at time $t_8$ in the second cycle, contact 2 of the switch $A_{17}$ completes a circuit from the battery 143 to the circuit breaker $CB_{28}$. Contact 3 of the switch $A_{17}$ is connected in parallel with contact 3 of the switch $A_{27}$ and furnishes potential to the circuit breakers in the first level through contact 1 of the first level switching devices. In this manner, the indication contained in the first level will be retained during subsequent cycles when said switches M and D are open. For a multiplier number of more than three digits, there would be a connection from the contacts in the seventh level for each extra digit.

In time $t_8$ of the second cycle when said circuit breakers on the eighth level are closed, potential will be supplied to $CB_{28}$ through contact 2 of the switch $A_{17}$ to operate the relay $R_2$ and set the switching device $SD_{28}$ to a "1" position. Since the circuit for the circuit breaker $CB_{18}$ has been opened at contact 9 of the switch $A_{07}$, the switching device $SD_{18}$ will be set in its "0" position.

At the end of the second cycle, switching devices $SD_{01}$ and $SD_{21}$ are set to a "1" position and device $SD_{11}$ set to a "0" position to indicate the multiplier 101, the switching devices $SD_{02}$, $SD_{12}$ and $SD_{22}$ are set to a "1" position to indicate the multiplicand 111, and in level 3, the switching devices $SD_{13}$, $SD_{23}$ and $SD_{33}$ are set to a "1" position to represent the shifted multiplicand 0111. In the fourth, fifth and sixth levels, all switching devices in the zero, first and second digit positions are set to a "1" position. In the fourth level this indicates the first partial product 111. The fifth level represents the new partial sum 111. The sixth level represents the initial partial sum as 111. In the seventh level, the switching device $SD_{17}$ is set to a "1" position and through its contacts $A_{17}$ selects the second multiplier digit represented by the condition of the switching device $SD_{11}$. In the eighth level the switching device $SD_{28}$ has been operated to complete a circuit to the circuit breaker $CB_{27}$. During the second cycle the switches M and D have been opened as shown in FIGURE 11.

In the second cycle of operation, the multiplier digits are retained on the first level by a circuit from the battery 143 through contact 3 of the switch $A_{17}$, the line 155 and contacts 1 of the first level switching devices to the first level circuit breakers. Accordingly, during a time $t_1$ in the third cycle, the switching devices in the first level will remain set in a "1" position. During a time $t_2$ when the second level circuit breakers are effective, circuits will be connected from the battery 143 through contact 4 of the switch $A_{17}$, a conductor 167 and the single contacts of the third level switching devices to the associated circuit breakers in the second level. Consequently, if the switching devices in the third level are closed, circuits will be completed to the circuit breakers of the second level to energize the associated relays (at time $t_2$) and the second level switching devices will be set to the indication contained on the third level. Since the switching devices $SD_{13}$, $SD_{23}$ and $SD_{33}$ were set to "1" in the second cycle providing a third level indication of 0111, this binary quantity will now be registered on the second level by setting the switching devices $SD_{12}$, $SD_{22}$ and $SD_{32}$ to a "1" position.

The indication 0111 contained in the second level at time $t_2$ of the third cycle requires the switching devices $SD_{12}$, $SD_{22}$ and $SD_{32}$ to be operated to a "1" position. The contact 1 in the switches $A_{12}$, $A_{22}$ and $A_{32}$ of each of these switching devices is connected from the energized line 151 to the third level circuit breakers $CB_3$, $CB_{33}$ and $CB_{43}$ so that at a time $t_3$ in the third cycle, the switching devices $SD_{24}$, $SD_{34}$ and $SD_{44}$ will be set to a "1" position. Accordingly, the third level will indicate the third partial product 00111.

It will be remembered that contact 1 of the switch $A_{17}$ is effective to connect the battery 143 to contact 2 of the switch $A_{11}$, the switching device $SD_{11}$ being set to indicate the second multiplier digit. Since the second multiplier digit is "0," the contact 2 of this switching device will be open and no potential will be applied to the contacts 2 of the individual level 2 switching devices. Accordingly, during a time $t_4$ in the third cycle when the contacts 2 are connected to the fourth level circuit breakers, there will be no potential applied and the switching devices of the fourth level will be set to "0."

In the second cycle, the fourth level switching devices $SD_{04}$, $SD_{14}$ and $SD_{24}$ were set to indicate the binary number 111 and subsequently the same indication was registered in the fifth and sixth level by setting the switching devices $SD_{05}$, $SD_{15}$, $SD_{25}$ and $SD_{06}$, $SD_{16}$, $SD_{26}$, respectively, to a "1" position. With the switching devices $SD_{06}$, $SD_{16}$ and $SD_{26}$ in the "1" position and the devices $SD_{04}$, $SD_{14}$ and $SD_{24}$ now switched (at time $t_4$) to the "0" position, potential will be applied to the circuit breaker $CB_{05}$ from the energized line 150 through left contact of the switch $A_{04}$ and right contact 1 of the switch $A_{06}$. In addition, the circuit breaker $CB_{15}$ will be energized from the line 150 through left contact of the switch $A_{04}$, the line 153, right contact 4 of the switch $A_{16}$ and left contact 4 of the switch $A_{14}$. Finally, the circuit breaker $CB_{25}$ will be energized by a circuit from the energized conductor 153 through left contact 1 of the switch $A_{14}$, right contact 1 of the switch $A_{16}$, the line 156, right contact 4 of the switch $A_{26}$ and left contact 4 of the switch $A_{24}$. Therefore, during a time $t_5$ in the third cycle, the fifth level switching devices will retain the indication 111 registered in a previous cycle.

The single contacts of the fifth level switches are connected to the energized lines 150 or 152 and to the circuit breakers associated with the switching devices of level 6. Therefore, during the time $t_6$ in the third cycle the sixth level switching devices $SD_{06}$, $SD_{16}$ and $SD_{26}$ also retain the indication 111 registered during the second cycle.

During a time $t_7$ in the third cycle, the circuit breaker $CB_{27}$ couples a potential through the previously operated contact 2 of the switch $A_{28}$ to the relay $R_2$ so that the switching device $SD_{27}$ will be set to a "1" position. Since the switching device $SD_{18}$ was set to a "0" position during the second cycle, the circuit breaker $CB_{17}$ will not be connected to the battery 143 and the switching device $SD_{17}$ will be set to a "0" position.

Examining the switching device $SD_{27}$, contact 1 of the switch $A_{27}$ is connected to contact 2 of the switch $A_{21}$, contact 2 is connected to the circuit breaker $CB_{08}$, and energized contact 3 is connected through a line 155 to contacts 1 of the first level switching devices, which contain an indication of the multiplier number 101. Therefore circuits are completed to the first level circuit breakers so that its information will be retained during the succeeding cycle.

During a time $t_8$ in the third cycle, the switching device $SD_{28}$ will be set to a "0" position since the switching device $SD_{17}$ was opened during the previous time $t_7$. However, at this time the switching device $SD_{08}$ will be operated since potential is applied from the battery 143 through the second contact of the switch $A_{27}$ to the circuit breaker $CB_{08}$.

In the third cycle of operation the multiplier number 101 was retained in level 1 by means of the circuits set up by the third contact of the switch $A_{27}$. In level 2, the number 0111 obtained from level 3 was stored. In level 3, switching devices $SD_{23}$, $SD_{33}$ and $SD_{43}$ were operated to provide an indication of the number 00111. All switching devices in level 4 are set to "0" position since the second digit of the multiplier was "0." Levels 5 and 6 retain the indication 111 while in levels 7 and 8, the switching devices $SD_{27}$ and $SD_{08}$ have been operated.

In the fourth cycle of operation the multiplier number is retained, as explained above, when the first level circuit breakers operate at a time $t_1$.

During the time $t_2$, the second level circuit breakers are controlled by the contacts of the switching devices in the third level. Therefore, since the third level is storing the binary quantity 00111, which corresponds to the switching devices $SD_{23}$, $SD_{33}$ and $SD_{43}$ being set to a "1" position, during this time the second level switching devices $SD_{22}$, $SD_{32}$ and $SD_{42}$ will be operated to indicate the aforesaid binary number.

During the time $t_3$ in the fourth cycle, the third level circuit breakers are controlled by the contacts 1 of the level 2 switches. Therefore, the number 000111 is read into the third level since it registers a shifted number in relation to level 2. While this step is in logical sequence, there is no use for this particular third level indication and it need not be further considered.

Potential is applied through contact 1 of the switching device $SD_{27}$, operated in the third cycle, to contact 2 of the switching device $SD_{21}$ set to indicate the binary digit 1, which is the last digit in the multiplier. Therefore, such potential will be furnished to the second level switching devices. In accordance with the indication contained in level 2, which is 00111, the contacts of the switches $A_{22}$, $A_{32}$ and $A_{42}$ will be closed so that potential will be supplied to the fourth level circuit breakers $CB_{24}$, $CB_{34}$ and $CB_{44}$. Accordingly, during a time $t_4$ in the fourth cycle, the indication 00111 will be registered in the switching devices $SD_{24}$, $SD_{34}$ and $SD_{44}$ according to the circuit completed through the associated circuit breakers.

During a time $t_5$ in the fourth cycle when the fifth level circuit breakers are closed and the corresponding switching cams operable, operations will occur in each of the digit positions. Thus, in the zero digit position ($2^0$) including the switching devices $SD_{04}$, $SD_{05}$ and $SD_{06}$, the device $SD_{04}$ is in a "0" position and the switching device $SD_{06}$ is in a "1" position. A circuit will be connected from the energized line 150 through the left contact of the switch $A_{04}$ and the right contact 1 of the switch $A_{06}$ to the circuit breaker $CB_{05}$. Therefore, the switching device $SD_{05}$ will be set to a "1" position at time $t_5$. In addition, the battery 143 will be connected from the line 150 through the left contact of the switch $A_{04}$ to the line 153, the "no carry" line associated with the zero digit position. A "carry" line 154 also leads from this binary position.

In digit position one ($2^1$), the switching device $SD_{14}$ is set to a "0" position and the device $SD_{16}$ to a "1" position. Potential from the line 153 is connected through the right contact 4 of the switch $A_{16}$ and the left contact 4 of the switch $A_{14}$ to the circuit breaker $CB_{15}$. Accordingly, the switching device $SD_{15}$ will be set to a "1" position. Potential from the "carry" line 159 of digit coupled to the "no carry" line 156 (a "carry" line 157 also being provided) through left contact 1 of the switch $A_{14}$ and right contact 1 of the switch $A_{16}$.

In digit position two ($2^2$), the switching devices $SD_{24}$ and $SD_{26}$ are in "1" positions, a circuit for this digit position being made from the battery 143 through the line 152, right contact 2 of the switch $A_{24}$ and right contact 2 of the switch $A_{26}$ to a "carry" line 159. A "no carry" line 158 is also associated with this position. There is no connection made to the circuit breaker $CB_{25}$ so that at time $t_5$, the switching device $SD_{25}$ will be set to a "0" position.

In digit position three ($2^3$), the switching device $SD_{34}$ is in a "1" position while the device $SD_{36}$ is in a "0" position. Potential from the "carry" line 159 of digit position two is connected through the right contact 3 of the switch $A_{34}$ and the left contact 2 of the switch $A_{36}$ to a "carry" line 161, a counterpart "no carry" line 160 also being provided. The switching device $SD_{35}$ will be set to a "0" state since no potential is applied to the circuit breaker $CB_{35}$ at time $t_5$.

Digit position four ($2^4$) operates in the same manner as digit position three since the switching device $SD_{44}$ is in a "1" position, the device $SD_{46}$ is in a "0" state and the "carry" line 161 is energized. Under these conditions a "carry" line 163 (having a "no carry" counterpart 162) is energized while the circuit breaker $CB_{45}$ remains de-energized. Therefore, at time $t_5$ the switching device $SD_{45}$ is set to a "0" state.

In digit position five ($2^5$), the switching devices $SD_{54}$ and $SD_{56}$ are in "0" positions. Energization of the "carry" line 163 indicates that a "1" must be carried from the lower digit position four. The potential will be applied from the line 163 through left contact 3 of the switch $A_{56}$ and left contact 4 of the switch $A_{54}$ to the circuit breaker $CB_{55}$ so that the switching device $SD_{55}$ will be set to a "1" position at time $t_5$ in the fourth cycle. Further "carry" and "no carry" lines 164 and 165, respectively, lead from the sixth digit position.

During a time $t_6$, the indications contained on level 5 will be registered on level 6 through the single contacts of the fifth level switches which are connected to the corresponding sixth level circuit breakers. Therefore, the sixth level switching devices will be set to indicate the number 110001 by setting the device $SD_{06}$ to a "1" position, the device $SD_{16}$ to a "1" position, the devices $SD_{26}$, $SD_{36}$ and $SD_{46}$ to a "0" position, and the device $SD_{56}$ to a "1" position.

At time $t_7$, the switching device $SD_{27}$ will be set to a "0" state since the device $SD_{27}$ was set to a "0" position in the third cycle and opened the circuit to the circuit breaker $CB_{27}$ through contact 2 of the switch $A_{28}$. In addition, since the device $SD_{08}$ is in a "1" position with the left contact of the switch $A_{08}$ open, there is no complete circuit to the circuit breaker $CB_{07}$ so that the device $SD_{07}$ remains in a "0" state.

At time $t_8$, the switching device $SD_{08}$ is set to a "0" position since the circuit to the circuit breaker $CB_{08}$ was interrupted when the device $SD_{27}$ was set to a "0" position.

In the fourth cycle, the third multiplier digit was selected by the cycling apparatus and the shifted multiplicand of level 2 registered in the accumulator where the sum of the partial products was determined. The cycling apparatus has now run through four cycles and all of its switching devices have been set to a "0" state. This sets up the circuit for the circuit breaker $CB_{07}$ through contacts 1 of the eight level switching devices so that when the multiplier is again operated, the cycling apparatus will perform its function.

When another multiplying operation is initiated, the first cycle enters the new multiplier and multiplicand digits in the first and second levels, respectively, and clears out the old values.

The above description together with the drawings illustrates the manner in which a number of modular units of the same type may be connected together to form a multiplier of any desired capacity. It will be observed that in the multiplier, multiplicand and shifted multipicand units, which comprise the first three levels, there are six switching devices $SD_{03}$, $SD_{31}$, $SD_{41}$, $SD_{51}$, $SD_{52}$ and $SD_{53}$ that are not utilized in the previously described operation. Three of these five, the devices $SD_{31}$, $SD_{52}$ and $SD_{53}$, would be utilized for a four digit number in either the multiplier or multiplicand. The accumulator units are increased by two for each additional digit used in both the multiplier and multiplicand.

The cycling unit has an additional stage which would be used for any additional digits in the multiplier since the multiplier apparatus must go through one additional cycle for each additional multiplier digit.

Other logical circuits employing the bistable switching devices and related elements, as discussed in connection with the multiplication system, may be made to cycle a predetermined number of times in order to perform some complex control, arithmetic or other operation. In such a system, the first cycle may be used as a control cycle to determine the number of complete cycles the machine makes before stopping.

The above examples should serve to indicate the many various logical circuits which may be provided in accordance with the present invention. Moreover, it will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. In a computing system using a binary notation, a plurality of bistable devices capable of being operated to a first or second stable state to indicate a binary "0" or "1," respectively, said devices being arranged in a plurality of first and second groups wherein each of said first groups is comprised of a plurality of devices each of which is included in one of said second groups, operating means associated with each said device to make it operable, each of said devices contained in each individual first group and the devices in the second group containing said last mentioned device being operable at a unique time, common conditioning means operatively associated with the devices in each of the first groups, one of the devices in one of the first conditioned groups being operated when one of the second groups in which said last mentioned device is contained is made operable, individual output circuit means each controlled by one of the devices, said output circuit means being in one of two positions in accordance with the state of its associated device, and means connecting said output circuit means of selected ones of said devices in series circuits to said conditioning means.

2. A system as defined in claim 1, wherein said second groups of devices are cyclically operable.

3. A system as defined in claim 2, wherein each said device has a circuit breaker associated therewith, said circuit breakers being connected in the circuits to the conditioning means, said circuit breakers operating to close their contacts at the unique time associated with the second group in which each device is contained.

4. A system as defined in claim 2, wherein the output circuit means of one of the second groups of said devices are connected to a series of the conditioning means displaced from the series of conditioning means associated with said one second group, and the output circuit means of another second group of said devices associated with said first mentioned series of conditioning means are connected to a series of conditioning means displaced from said second mentioned series of conditioning means, whereby an indication contained in said one second group of devices is displaced in accordance with the displacement between the series of conditioning means at the times at which said other second group of devices is made operable.

5. A system as defined in claim 2, in which are included an input second group, a temporary storage second group and a permanent storage second group, said first groups in which said devices of the input, temporary storage and permanent storage second groups are contained being identical for all second groups, the output circuit means of each device of said input group and said permanent storage group being selectively connected to the conditioning means of the first group in which said devices are contained or to the output circuit means of the devices in said input and permanent storage second groups contained in the next adjacent first group, dependent upon whether said devices of said second groups indicate a sum of "1" or or a carry of "1," respectively, whereby successive binary digits registered in said input group will be accumulated.

6. A cycling apparatus comprising a first series of cyclically operable bistable devices and a second series of cyclically operable bistable devices, said devices being set to a first or second stable state, means to make each series operable at a particular time, said bistable devices each including individual contact means settable to a first or second position in accordance with the state of said individual bistable device, said devices being set to a second position at a time $t_0$, a plurality of conditioning means each of which is associated with a device in each of said first and second series and operable to set each said device to a first or second state according to whether said conditioning means is energized or deenergized when said device is made operable, means connecting the conditioning means associated with a first one of said devices in the first series and a first one of said devices in the second series through an energizing circuit including said contact means of each device of said second series whereby at a time $t_1$ when said first series is made operable said first device will be set to a first state, means connecting the conditioning means of two second devices in the first and second series, respectively, to an energizing circuit through the contacts of said first device of said first series whereby at a time $t_2$ when said second series is made operable, said second device in said second series is operated to a first state, means connecting said last-mentioned conditioning means to the contacts of said second device of said second series such that an energizing circuit will be completed when said contacts of said second device are in a first stable state, whereby at a time $t_3$, when said first series is again made operable, said second device in said first series will be operated, wherein the energizing circuit of the conditioning means of said first device in said first series through the contacts of said devices of said second series with said devices in a second state is broken, and at time $t_3$ said first device of said first series is set to a second stable state.

7. A shift register comprising a first series of cyclically operable bistable devices and a second series of cyclically operable bistable devices, said devices being set to a first or second stable state, means to make each series operable at a particular time, said bistable devices each including individual contact means settable to a first or second position in accordance with the state of its associated device, a plurality of conditioning means each of which is associated with a device in each of said first and second series and operable to set each said device to a first or second state according to whether said conditioning means is energized or deenergized when each said device is made operable, means energizing each of said conditioning means in accordance with each digit of a digital number whereby when said devices in said first series are operable at a time $t_1$, said devices will be set to indicate said digital number, means connecting said contact means of said first series to said conditioning means associated with the next higher order digit whereby at a time $t_2$, when said devices in said second series are made operable, said conditioning means will be energized in accordance with the shifted digital number and said second series of devices will be set to indicate said digital number, means connecting said contact means of said devices of said second series to said conditioning means associated with said devices of said first series whereby at a time $t_3$ when said devices in said first series are again made operable said conditioning means will be energized in accordance with the indication contained in said second series and said first series will be set to indicate such an indication.

8. In a binary accumulator using digital words wherein each digit is represented by a "0" or "1" a plurality of cyclically operable bistable devices capable of being set to a first or second stable state wherein one state is an indication of the binary digit "1" and the other state is an indication of the binary digit "0," means to make each bistable device operable at a predetermined time, conditioning means associated with each bistable device and operable to determine whether said device will be set to a first or second state when said device is made operable, each said bistable device being associated with a plurality of other of the bistable devices to form a series, the state of each bistable device in a series being indicative of a particular binary digit, the series of devices being indicative of a digital word, each series of bistable devices being operable at a predetermined time in a cycle, the plurality of bistable devices forming a first, second and third series of devices, each series containing at least a number of devices equal in number to the number of digits in the largest digital word to be registered in any one of said series, means to operate said conditioning means in accordance with the digits of a digital word to be entered into the accumulator such that during a time $t_1$, at which time all devices in the first series will be operable, the devices in said first series will be set to indicate the digital word, means connecting said first and third series of devices to said conditioning means whereby at a time $t_2$ when said second series of devices is made operable said conditioning means will be operated in accordance with a function of the indications contained in said first and third series of devices whereby said second series will be set to indicate a function of the indications contained on said first and third series of devices, means connecting said second and third series of devices to said conditioning means whereby at a time $t_3$ when said devices in said third series are made operable said conditioning means will be operated in accordance with the indications contained in said second series of devices whereby said third series will be set to indicate the indication contained in said second series of devices.

9. A binary accumulator as defined in claim 8, wherein said conditioning means comprises a plurality of electromechanical elements equal in number to at least as many digits as will be contained in the largest digital word which is to be registered and wherein each element is coupled to each device of the same binary digit indication in each of said series.

10. A binary accumulator as defined in claim 9, wherein said means for connecting said series of devices to said conditioning means includes contact means operable by said devices to make the predetermined connections.

11. In a multiplier using digital words wherein each digit is represented by a "0" or "1," a plurality of cyclically operable bistable devices capable of being set to a first or second stable state wherein one state is an indication of the binary digit "1" and the other state is an indication of the binary digit "0," means to make each bistable device operable at a predetermined time, conditioning means associated with each bistable device and operable to determine whether said devices will be set to a first or second state when said device is made operable, each said bistable device being associated with a plurality of other of the bistable devices to form a series, the state of each bistable device in a series being indicative of a particular binary digit, the series of devices being indicative of a digital word, each series of bistable devices being operable at a predetermined time in a cycle, the plurality of bistable devices forming eight series of devices, each series containing at least a number of devices equal in number to the number of digits in the largest digital word to be registered in any one of said series, means to operate said conditioning means in accordance with the digits of a digital multiplier word to be entered into the multiplier such that during a time $t_1$, at which time all devices in the first series will be operable, the devices in said first series will be set to indicate the multiplier, means to operate said conditioning means in accordance with the digits of a digital multiplicand word to be entered into the multiplier such that at a time $t_2$, at which time all devices in the second series will be operable, the devices in said second series will be set to indicate the multiplicand, means connecting said devices of said second series to said conditioning means associated with the devices of the third series wherein each said device of said third series which is associated with each said conditioning means is representative of the next higher order binary digit, whereby at a time $t_3$ when said third series is operable said devices in said third series will be set to indicate a shifted multiplicand, accumulating means comprising the fourth, fifth and sixth series of devices operable at times $t_4$, $t_5$ and $t_6$, means connecting said devices of said second series to said conditioning means, whereby at a time $t_4$ said devices of said fourth series will be set to indicate the indication contained on said second series, said accumulator being operable during times $t_5$ and $t_6$ to register a function of the indications contained in said fourth and sixth series in said fifth series and register said indication of said fifth series in said sixth series, cycling means comprising the seventh and eighth series of devices operable to set one device in the first to sixth series during times $t_7$ and $t_8$, means associated with each device in said seventh series and operable when said associated device in said seventh series is in a set position to initiate a circuit to an associated device in said first series, each said device in said first series when in a set position operable to complete the circuit to all of said devices in said second series whereby at a time $t_4$ in a subsequent cycle said indication in said second series will be transferred to said fourth series if said associated device in said first series is in a set position.

12. In a computation system, the combination of a plurality of bistable devices arranged in rows and columns, conditioning means operatively associated with each column to condition the devices contained therein for operation, operating means associated with each device in each row to operate any device in the row which has been conditioned to one of its stable states, individual output means each controlled by the state of one of the bistable devices, and means to connect selectively each said output means in series to the other output means of said devices and said conditioning means wherein the state of each device may be transferred to another selected device.

13. A system as defined in claim 12 wherein the output means of one row of devices are connected to conditioning means shifted with respect to the column arrangement of said one row and the output means of a second row of devices are connected to the conditioning means whose columns include said last-mentioned devices, said operating means associated with said rows being operated in time sequence, whereby the states of said devices contained in said one row will be successively transferred between said one and second row and will be shifted according to the column shift.

14. In computer apparatus, a plurality of bistable devices arranged in rows and columns wherein each of the rows is comprised of a plurality of devices each of which is included in one of the columns, a relay coil operatively associated with each column of devices, armature means in each device adapted to be actuated between two positions by one of the relay coils, selector means operatively associated with each device, means actuating the selector means into engagement with its corresponding armature means to operate the selector means in accordance with the position of said armature means, and at least one switch operated independently by each of the selector means, the position of the switch subsequent to actuation of the selector means being dependent upon the condition of the relay coil during actuation of the selector means, and means electrically connecting selected ones of the switches together to form a relay sequential circuit.

15. In computer apparatus, a plurality of bistable devices arranged in rows and columns wherein each of the rows is comprised of a plurality of devices each of which is included in one of the columns, a relay coil operatively associated with each column of devices, armature means in each device adapted to be actuated by one of the relay coils, selector means including a lever operable between two positions operatively associated with each device, mechanical means moving the selector means into engagement with a corresponding one of said armatures to operate the lever in accordance with the position of said armature, a circuit breaker coupled to each of said mechanical means and actuated upon movement of the selector means, and at least one switch operated independently by each of the selector means, the position of the switch subsequent to movement of the selector means being dependent upon the condition of the relay coil during actuation of the selector means, and means electrically interconnecting selected ones of the switches to form at least a logical circuit.

16. In computer apparatus, a plurality of bistable devices arranged in rows and columns wherein each of the rows is comprised of a plurality of devices each of which is included in one of the columns, a relay coil operatively associated with each column of devices, an armature in each device adapted to be actuated by one of the relay coils, selector means including a lever operable between two positions by a rotatable cam operatively associated with each device, an element on the lever displaceable between two positions, the element being urged into engagement with a corresponding one of said armatures upon operation of the lever by said cam to displace said element in accordance with the position of said armature, and at least one switch means operated independently by each of the elements, the operation of the switch means subsequent to operation of the lever being dependent upon the condition of the relay coil during operation of the lever, and conductor means electrically interconnecting selected ones of the switch means to form at least a portion of a logical circuit.

17. A system as defined in claim 16 in which a circuit breaker is coupled to each of the cams and actuated in accordance with the rotation of said cam.

18. In computer apparatus, a plurality of bistable devices arranged in rows and columns wherein each of the rows is comprised of a plurality of devices each of which is included in one of the columns, a relay coil operatively associated with each column of devices, an armature in each device adapted to be actuated between two positions by one of the relay coils, a pair of first projections laterally spaced a first distance on said armature, selector means including a lever operable between two positions by a rotatable cam operatively associated with each device, said cams operating the devices in each row at a unique time, an element on the lever displaceable between two positions and carrying second projections laterally spaced apart a second distance, the element being moved upon operation of the lever to urge one of the second projections into engagement with one of the first projections to operate the element in accordance with the position of a corresponding one of said armatures, said first and second distances being determined so that one of the projections on said element engages one of the projections on said armature in both positions of said armature, and at least one switch means operated independently by each of the elements, the position of the switch means subsequent to operation of the lever being dependent upon the condition of the relay coil during operation of the lever, and conductor means electrically interconnecting selected ones of the switch means to form at least a portion of a logical circuit.

19. A system as defined in claim 18 in which a circuit breaker is coupled to each of said cams and actuated in accordance with the rotation of said cam, and means interconnecting said circuit breakers with the switch means to form a portion of a logical circuit.

20. Apparatus as defined in claim 18 in which circuit breakers are included in the logical circuit, and means on each of the levers to actuate a corresponding circuit breaker in accordance with rotation of the associated cam.

21. Switching apparatus comprising a relay coil adapted to be energized for actuating a plurality of armatures between two positions, each of said armatures carrying a pair of first projections laterally spaced a first distance, a like plurality of selector means each including a lever operable between two positions by a rotatable cam, an element on the lever displaceable between two positions and carrying second projections laterally spaced apart a second distance, each of the elements being moved upon operation of the lever to urge one of the second projections into engagement with one of the first projections to operate the element in accordance with the position of a corresponding one of said armatures, said first and second distances being determined so that one of the projections on said element engages one of the projections on said armature in both positions of said armature, and at least one switch means operated by each of the elements, the position of the switch means subsequent to operation of the lever being dependent upon the condition of the relay coil during operation of the lever.

22. Apparatus as defined in claim 21 in which a circuit breaker is coupled to each of said cams and actuated in accordance with the rotation of said cam.

23. In a cyclically operated switching mechanism; a plurality of sets of contacts; a conditioning relay having a like plurality of armatures associated with corresponding sets of contacts; interposer means between each set of contacts and its corresponding relay armature; differentially timed selector cams for operating the respective interposer means; and a like plurality of circuit breakers operable at differential times, said selector cams being operable during particular circuit breaker operating times to adjust corresponding sets of contacts in accordance with the condition of the relay.

24. In a switching mechanism; a plurality of sets of contacts; a conditioning device in one of two states having a corresponding plurality of operable means positioned in accordance with the state of the device; interposer means between each set of contacts and its corresponding operable means for determining the adjustment of said set of contacts; differentially timed selector means for operating the respective interposer means; and circuit completing means operable at differential times; said selector means being operable during circuit completing means operating times to adjust corresponding sets of contacts in accordance with the state of the conditioning device.

25. In a cyclically operated switching mechanism; sets of contacts in a plurality of levels of contacts; a conditioning relay having a corresponding plurality of armatures, one for each level; interposer means between each level of contacts and the corresponding armature; a selector cam for each interposer means and operable at a differential time to adjust the level of contacts in accordance with the position of the corresponding armature; circuits interconnecting the contacts of said levels and the conditioning relay; and a circuit breaker for each level of contacts disposed in said circuits and operable at a differential time to cause said switching mechanism to perform functions particular to the different levels of said contacts, said selector cams being operable during particular circuit breaker times to adjust corresponding levels of contacts in accordance with the state of the conditioning relay.

26. In a cyclically operated accumulating mechanism, a series of levels of contacts; a conditioning relay having a corresponding plurality of armatures; interposer means between each level of contacts and a corresponding armature; a series of circuit breakers corresponding to the levels of contacts and timed for successive operation; circuits interconnecting said contacts, relay and circuit breakers and including input circuits operable through the first circuit breaker to condition the relay according to the input data; selector cams for the respective levels of contacts and operable at corresponding circuit breaker times to adjust the contacts in accordance with the condition of the relay; the operation of the first selector cam during the first circuit breaker time being effective to adjust the first level of contacts to set up circuits which will be completed during the next circuit breaker time to condition the relay according to the sum of the input data and the data stored in a third level of contacts; the operation of the second selector cam during the second circuit breaker time being effective to adjust a second level of contacts to set up circuits which will be completed during the next circuit breaker time to condition the relay again according to the same sum, and the operation of the third selector cam during the third circuit breaker time being effective to adjust a third level of contacts to set up storage circuits which will be completed during the second circuit breaker time in the next cycle of operation, thus serving to store the sum in the accumulating mechanism.

References Cited in the file of this patent

UNITED STATES PATENTS

| | | |
|---|---|---|
| 1,157,079 | Bricken | Oct. 19, 1915 |
| 2,236,795 | Fuber | Apr. 1, 1941 |
| 2,318,591 | Couffignal | May 11, 1943 |
| 2,364,540 | Luhn | Dec. 5, 1944 |
| 2,386,763 | Williams | Oct. 16, 1945 |
| 2,413,859 | Brand | Jan. 7, 1947 |
| 2,540,226 | Williams | Feb. 6, 1951 |
| 2,547,482 | McKiever | Apr. 3, 1951 |
| 2,573,561 | Furman | Oct. 30, 1951 |
| 2,573,581 | Lake et al. | Oct. 30, 1951 |
| 2,604,262 | Phelps | July 22, 1952 |
| 2,625,326 | Mumma | Jan. 13, 1953 |
| 2,638,267 | Hartley et al. | May 12, 1953 |
| 2,667,628 | Chaveneaud | Jan. 26, 1954 |
| 2,668,661 | Stibitz | Feb. 9, 1954 |
| 2,717,734 | Hofgaard | Sept. 13, 1955 |
| 2,770,416 | Hopkins | Nov. 13, 1956 |
| 2,790,160 | Millership | Apr. 23, 1957 |
| 2,792,991 | Di Cambio | May 21, 1957 |
| 2,834,007 | Smith | May 6, 1958 |
| 2,872,110 | Snyder | Feb. 3, 1959 |
| 2,873,438 | Bieganski et al. | Feb. 10, 1959 |

FOREIGN PATENTS

| | | |
|---|---|---|
| 176,686 | Austria | Nov. 10, 1953 |

UNITED STATES PATENT OFFICE
CERTIFICATION OF CORRECTION

Patent No. 3,038,657                                                                 June 12, 1962

Frederic A. Foss

It is hereby certified that error appears in the above numbered patent requiring correction and that the said Letters Patent should read as corrected below.

Column 2, lines 21 and 22, for "synshronism" read -- synchronism --; column 4, line 63, for "whihc" read -- which --; line 65, for "selectivlye" read -- selectively --; column 7, line 26, for "level" read -- lever --; line 36, strike out "the"; column 10, line 59, for "multiplifier" read -- multiplier --; column 11, line 37, for "break" read -- breaker --; same line 37, for "AR" read -- R --; line 74, after "to" insert -- a --; column 14, line 71, after "of" insert -- the --; column 16, line 1, for "CB$_3$" read -- CB$_{23}$ --; column 17, line 56, after "position" and before the period insert -- at time t$_5$ --; same line 56, for "Potential from the "carry" line 159 of digit" read -- The potential on the line 153 is also --; column 18, line 31, for "SD$_{27}$" read -- SD$_{28}$ --; column 25, line 21, for "Fuber" read -- Furber --.

Signed and sealed this 2nd day of October 1962.

(SEAL)
Attest:

ERNEST W. SWIDER                                             DAVID L. LADD
Attesting Officer                                                Commissioner of Patents